United States Patent
Du et al.

(10) Patent No.: US 11,448,808 B2
(45) Date of Patent: Sep. 20, 2022

(54) COLOR COMPENSATING OPTICAL FILTERS HAVING LOW REFRACTIVE INDEX LAYER

(71) Applicant: 3M INNOVATIVE PROPERTIES COMPANY, St. Paul, MN (US)

(72) Inventors: Guanglei Du, New York, NY (US); John A. Wheatley, Stillwater, MN (US); Matthew E. Sousa, Rosemount, MN (US); Anthony M. Renstrom, Forest Lake, MN (US); Neeraj Sharma, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 537 days.

(21) Appl. No.: 16/475,207

(22) PCT Filed: Jan. 3, 2018

(86) PCT No.: PCT/US2018/012232
§ 371 (c)(1),
(2) Date: Jul. 1, 2019

(87) PCT Pub. No.: WO2018/129076
PCT Pub. Date: Jul. 12, 2018

(65) Prior Publication Data
US 2019/0339432 A1 Nov. 7, 2019

Related U.S. Application Data

(60) Provisional application No. 62/442,227, filed on Jan. 4, 2017.

(51) Int. Cl.
*B32B 5/16* (2006.01)
*G02B 5/02* (2006.01)
*G02B 5/28* (2006.01)
*F21V 8/00* (2006.01)
*G02B 1/11* (2015.01)

(52) U.S. Cl.
CPC .............. *G02B 5/285* (2013.01); *B32B 5/16* (2013.01); *G02B 5/0242* (2013.01);
(Continued)

(58) Field of Classification Search
CPC .. B32B 5/16; G02B 1/11; G02B 5/285; G02B 5/0242; G02B 5/0294; G02B 6/0016; G02B 6/0025
See application file for complete search history.

(56) References Cited

U.S. PATENT DOCUMENTS

| 5,956,122 A | 9/1999 | Doster |
| 10,169,651 B2 | 1/2019 | Gu |

(Continued)

FOREIGN PATENT DOCUMENTS

| CN | 203733133 | 7/2014 |
| CN | 104573667 | 4/2015 |

(Continued)

OTHER PUBLICATIONS

International Search Report for PCT International Application No. PCT/US2018/012232, dated Apr. 20, 2018, 6 pages.

*Primary Examiner* — Ryan S Dunning
(74) *Attorney, Agent, or Firm* — Clifton F. Richardson

(57) ABSTRACT

Example systems may include one or both of a light emitter and a light receiver, and an optical filter. The optical filter may include a wavelength selective scattering layer configured to scatter visible light. The optical filter may include a wavelength selective reflecting layer having a predetermined transmission band configured to compensate for a color deviation. The optical filter may include a broadband reflecting layer having a predetermined reflection band configured to compensate for a color deviation. The optical filter may include a low-index layer configured to reduce a color deviation in light emitted by the light emitter or received by the light receiver. The wavelength selective scattering layer may include nanoparticles dispersed in a binder, wherein the ratio of the nanoparticles to the binder by weight is at least 50%. Example articles may include example optical filters.

20 Claims, 12 Drawing Sheets

(52) U.S. Cl.
CPC ......... *G02B 5/0294* (2013.01); *G02B 6/0016* (2013.01); *G02B 6/0025* (2013.01); *G02B 1/11* (2013.01)

(56) References Cited

U.S. PATENT DOCUMENTS

| | | | |
|---|---|---|---|
| 10,348,239 B2 * | 7/2019 | Yordem | .................. H02S 40/22 |
| 2008/0316594 A1 | 12/2008 | Hashiguchi | |
| 2011/0195239 A1 | 8/2011 | Takane | |
| 2012/0038990 A1 | 2/2012 | Hao | |
| 2012/0200919 A1 | 8/2012 | Petaja | |
| 2013/0011608 A1 | 1/2013 | Wolk | |
| 2014/0326292 A1 * | 11/2014 | Yordem | .................. H02S 40/22 |
| | | | 136/246 |
| 2015/0056413 A1 | 2/2015 | Hwang | |
| 2015/0369433 A1 * | 12/2015 | Chen | .................... G02B 5/1861 |
| | | | 362/157 |
| 2017/0123122 A1 * | 5/2017 | Ballif | ....................... G02B 5/26 |
| 2017/0318239 A1 | 11/2017 | Miyasaka | |

FOREIGN PATENT DOCUMENTS

| | | |
|---|---|---|
| CN | 204442500 | 7/2015 |
| CN | 105278225 | 1/2016 |
| JP | 2013-065052 | 4/2013 |
| JP | 2016-118686 | 6/2016 |
| WO | WO 2014-178276 | 11/2014 |
| WO | WO 2015-155357 | 10/2015 |
| WO | WO 2016-117452 | 7/2016 |
| WO | WO 2017-124664 | 7/2017 |

\* cited by examiner

COLOR COMPENSATING OPTICAL FILTERS HAVING LOW REFRACTIVE INDEX LAYER

BACKGROUND

Light may reflect from surfaces in different ways, for example, as a specular reflection or as a diffusive reflection. In opaque materials, specular reflection may occur on an uppermost surface layer of the material, for example, at an air/material interface, and the reflection may carry a full spectrum of incident light. Specular reflection may manifest as shininess or gloss, which may account for less than 4% of the total reflected light. In contrast, diffusive reflection may occur under a top surface of the material, and may carry selected wavelengths or color. For example, color may be seen in the diffuse reflection of a non-metallic object. Both kinds of reflection may be observed, for example, at hybrid surfaces such as surfaces including a paint coat covered by a clear top coat. Thus, specular reflection may occur at the air/top coat interface, while diffuse reflection may occur at the top coat/paint coat interface.

Optical filters are employed in a wide variety of applications such as optical communication systems, sensors, imaging, scientific and industrial optical equipment, and display systems. Optical filters may include optical layers that manage the transmission of incident electromagnetic radiation, including light. Optical filters may reflect or absorb a portion of incident light, and transmit another portion of incident light. Optical layers within an optical filter may differ in wavelength selectivity, optical transmittance, optical clarity, optical haze, and index of refraction.

SUMMARY

In an example, the disclosure describes an example system that includes one or both of a light emitter or a light receiver. The example system includes an optical filter adjacent one or both of the light emitter or the light receiver. The optical filter includes a wavelength selective scattering layer. The wavelength selective scattering layer is configured to scatter visible light. The example system includes a wavelength selective reflecting layer. The wavelength selective reflecting layer has a predetermined transmission band configured to compensate for a color deviation in light emitted by the light emitter or received by the light receiver.

In an example, the disclosure describes an example article that includes an optical filter. The optical filter includes a wavelength selective scattering layer. The wavelength selective scattering layer is configured to scatter visible light. The example system includes a wavelength selective reflecting layer. The wavelength selective reflecting layer has a predetermined transmission band configured to compensate for a color deviation in light received by the optical filter.

In an example, the disclosure describes an example system including one or both of a light emitter or a light receiver. The example system includes an optical filter adjacent one or both of the light emitter or the light receiver. The optical filter includes a wavelength selective scattering layer. The wavelength selective scattering layer is configured to scatter visible light. The optical filter may also include a broadband reflecting layer. The broadband reflecting layer has a predetermined reflection band configured to compensate for a color deviation in light emitted by the light emitter or received by the light receiver.

In an example, the disclosure describes an example article including an optical filter. The optical filter includes a wavelength selective scattering layer. The wavelength selective scattering layer is configured to scatter visible light. The optical filter may also include a broadband reflecting layer. The broadband reflecting layer has a predetermined reflection band configured to compensate for a color deviation in light received by the optical filter.

In an example, the disclosure describes an example system including one or both of a light emitter or a light receiver. The example system includes an optical filter adjacent one or both of the light emitter or the light receiver. The optical filter includes a wavelength selective scattering layer. The wavelength selective scattering layer is configured to scatter visible light. The optical filter includes a wavelength selective reflecting layer and a low-index layer adjacent the wavelength selective reflecting layer. The low-index layer is configured to reduce a color deviation in light emitted by the light emitter or received by the light receiver.

In an example, the disclosure describes an example article including an optical filter. The optical filter includes a wavelength selective scattering layer. The wavelength selective scattering layer is configured to scatter visible light. The optical filter includes a wavelength selective reflecting layer and a low-index layer adjacent the wavelength selective reflecting layer. The low-index layer is configured to reduce a color deviation in light received by the optical filter.

In an example, the disclosure describes an example system including one or both of a light emitter or a light receiver, and an optical filter adjacent one or both of the light emitter or the light receiver. The optical filter includes a wavelength selective scattering layer. The wavelength selective scattering layer is configured to scatter visible light. The wavelength selective scattering layer includes nanoparticles dispersed in a binder. The ratio of the nanoparticles to the binder by weight is at least 50%.

In an example, the disclosure describes an example article including an optical filter. The optical filter includes a wavelength selective scattering layer. The wavelength selective scattering layer is configured to scatter visible light. The wavelength selective scattering layer includes nanoparticles dispersed in a binder. The ratio of the nanoparticles to the binder by weight is at least 50%.

The details of one or more aspects of the invention are set forth in the accompanying drawings and the description below. Other features, objects, and advantages of the invention will be apparent from the description and drawings, and from the claims.

BRIEF DESCRIPTION OF DRAWINGS

The foregoing and other aspects of this invention are made more evident in the following Detailed Description, when read in conjunction with the attached Figures.

Figure 1A:
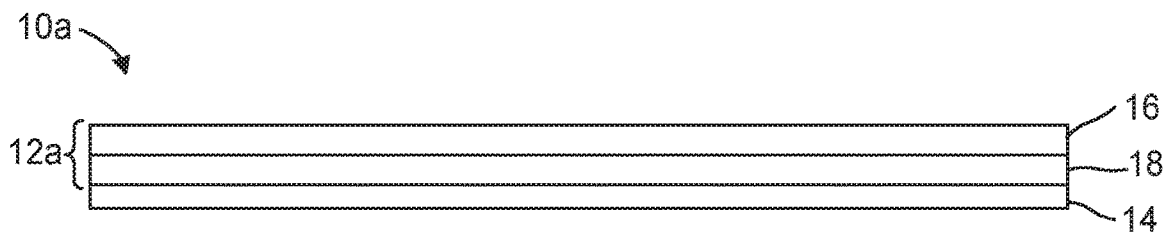
FIGS. 1A-1E are conceptual lateral cross-sectional views of example articles including optical filters.

It should be understood that features of certain Figures of this disclosure may not necessarily be drawn to scale, and that the Figures present non-exclusive examples of the techniques disclosed herein.

DETAILED DESCRIPTION

In this disclosure, "visible" refers to wavelengths in a range between about 400 nm and about 700 nm, and "near-infrared" refers to wavelengths in a range between about 700 nm and about 2000 nm, for example, wavelengths in a range between about 800 nm and about 1200 nm. ULI (ultra-low-index) films refers to optical films including a binder, a plurality of particles, and a plurality of interconnected voids, as described in U.S. Patent Application Publication No. 2012/0038990, incorporated herein in its entirety by reference.

Ambient sources of electromagnetic radiation may interfere with receivers configured to receive light of particular wavelengths or from particular sources, or with light emitters configured to emit light of particular wavelengths. For example, visible wavelengths may interfere with receiving, sensing, or transmitting near-infrared wavelengths, for example, by increasing noise in a light receiver or in a light emitter. Sources of electromagnetic radiation may also be unintentionally revealed. For example, while light emitted by a light emitter configured to emit only near-infrared wavelengths may not be visibly perceptible, the device or the structure responsible for emitting the light, for example, a housing of the light emitter, may be visibly perceptible. Masking, concealing or otherwise camouflaging the light emitter may present challenges because the camouflage techniques may undesirably result in blocking, interference, or reduction in the transmission of desired near-infrared wavelengths. Optical filters according to examples of this disclosure may be used to prevent unwanted optical interference from visible wavelengths, or to camouflage sources of electromagnetic radiation from visible perception, while at least partially allowing desired near-infrared wavelengths to be transmitted by a light emitter or received by a light receiver, or while allowing transmission of near-infrared wavelengths with relatively high clarity.

For example, a light receiver operating to receive or sense near-infrared wavelengths may be shielded from visible wavelengths, preventing interference with the receiving or sensing of near-infrared wavelengths that may be caused by visible wavelengths. A light transmitter operating to transmit near-infrared wavelengths may be camouflaged against visible perception by scattering visible wavelengths. For example, the scattered visible wavelengths may conceal the presence of the light transmitter, without obstructing the transmission of near-infrared wavelengths.

The amount of specular reflection off a surface may be determined by Fresnel reflection at an air/material interface. For an opaque surface with a clear top layer, it may be assumed that all specular reflection arises from the top air interface, and that the rest of the reflection is diffusive reflection from a bottom layer. An opaque colored material could also follow similar model, while using its refractive index to calculate Fresnel reflection on top surface and treat all other reflection is diffusive. The example optical filters may have a diffusive coating disposed on a clear substrate or a reflective film. When the diffusive coating is coated on clear substrate, it may have a higher haze to hide the items underneath. When the coating is coated on a reflector, the coating will diffuse incident light twice, by reflection. In that case, the coating may have less haze.

The visible color perception of a surface depends, inter alia, on the transmission and reflection spectra of materials at the surface, and on the spectra of light arriving at or passing through the surface. For example, a light source underlying a substrate, for example, an electronic component underneath an upper user-interactive surface of an electronic device may affect a perception of color at the surface generated by light scattering by a scattering layer. Without wishing to be bound by theory, different color compensation schemes may be used to reduce or eliminate a color deviation, for example, by using appropriate optical filters. For example, the color may be compensated by using a layer exhibiting controlled light leakage, for example, a wavelength selective reflecting layer, within a predetermined band adjacent a scattering layer. As another example, the color may be compensated by disposing a broadband reflecting layer adjacent the scattering layer. As a further example, a low-index layer may be added adjacent a reflecting layer to promote total internal reflection and prevent loss from rear of film. Color deviation may also be reduced using coatings including particles having controlled sizes, for example, titanium dioxide particles. Thus, example optical filters according to the disclosure may be used to compensate for color deviation, or for color compensation to provide a predetermined color perception.

Thus, example systems may include one or both of a light receiver and a light emitter, and an optical filter that includes a wavelength selective scattering layer that may at least partially reduce the transmission of visible wavelengths, while at least partially allowing the transmission of near-infrared wavelengths. For example, the wavelength selective scattering layer may scatter a majority of incident visible light. Example optical filters may include one or more of a wavelength selective reflecting layer, a broadband reflecting layer, or a low-index layer. Example systems and articles according to the present disclosure may include example optical articles including example wavelength selective scattering layers that transmit near-infrared light with relatively high clarity while reducing the transmission of visible wavelengths, for example, by selectively scattering or reflecting visible wavelengths.

FIGS. 1A-1E are lateral cross-sectional views of example articles including optical filters. FIG. 1A shows a lateral cross-sectional view of example article 10a including example optical filter 12a disposed on a substrate 14. The substrate 14 may include glass, polymer, metal, or any other suitable rigid, semi-rigid, or soft materials, and combinations thereof. While the substrate 14 is shown as a layer in the example article 10a of FIG. 1A, in some examples, substrate 14 may assume any suitable three-dimensional shape that may have a flat, a substantially flat, or a textured surface. In some examples, substrate 14 may include a housing, a screen, a part, or a surface of a device, for example, of an electronic device such as a personal computing or communication device, for example, a cellphone or a smartwatch.

In some examples, optical filter 12a includes a wavelength selective scattering layer 16 adjacent a wavelength selective reflecting layer 18. Wavelength selective scattering layer 16 may be configured to scatter visible light, as described elsewhere in the disclosure. Wavelength selective reflecting layer 18 may include one or more of a multilayer optical film, a dichroic reflector, an interference film, an interference filter, an inorganic multilayer stack, a metal dielectric stack, a polished substrate, a mirror, a reflective polarizer, or a reflective surface such as a reflective metal or glass surface, or any wavelength selective layer.

Wavelength selective reflecting layer 18 may have a predetermined transmission band configured to compensate for a color deviation in light received by optical filter 12a, for example, light emitted by a light emitter or received by a light receiver of an optical system. For example, wavelength selective reflecting layer 18 may leak light within a predetermined leakage band, for example, by transmitting wavelengths within the predetermined leakage band. The leaked wavelengths may be scattering by wavelength selective scattering layer 16, modifying a perceived color of light passing through optical filter 10.

In some examples, the predetermined transmission band is configured to compensate for the color deviation by shifting a scattered color towards a predetermined reference color. In some examples, the reference color is associated with predetermined L, a, and b color values. In some examples, the reference color is a white color, for example, a color perceived to be white, or nearly white. In some examples, the transmission band includes a narrow band centered at a wavelength between about 400 and about 600 nm. In some examples, wavelength selective reflecting layer 18 has a transmittance below a predetermined threshold between a lower transmission band edge and an upper transmission band edge of the predetermined transmission band. In some examples, wavelength selective reflecting layer 18 has a transmittance above the predetermined threshold beyond the lower and upper transmission band edges. In some examples, wavelength selective reflecting layer 18 substantially transmits no light between the lower transmission band edge and the upper transmission band edge. In some examples, the lower transmission band edge is at less than or about 400 nm and the upper transmission band edge is at greater than or about 800 nm.

In some examples, optical filter 12a may include a retroreflective layer or a retroreflective film adjacent wavelength selective reflecting layer 18. The retroreflective layer may include optical features that result in retroreflection, for example, cube corner elements or beads. In some examples, wavelength selective reflecting layer 18 may be disposed between the retroreflective layer and wavelength selective scattering layer 16. In some examples, optical filter 12a may be in optical communication with a retroreflective layer, film, or substrate.

In some examples, wavelength selective scattering layer 16 is configured to transmit near-infrared light. In some examples, wavelength selective scattering layer 16 selectively scatters visible light and transmits near-infrared light.

In some examples, wavelength selective scattering layer 16 may have a near-infrared scattering ratio of less than about 0.9, less than about 0.8, less than about 0.7, less than about 0.6, or less than about 0.5. The near-infrared scattering ratio is a ratio of an average near-infrared scattering to an average visible scattering. For example, the average scattering in a selected narrow or broad near-infrared wavelength band (for example, of bandwidth 1300 nm, 500 nm, 100 nm, 10 nm, 1 nm) may be determined, and the average scattering in a selected narrow or broad visible wavelength band may be determined, and a ratio of the respective averages may be determined. In some examples, wavelength selective scattering layer 16 may have a visible reflective haze ratio of greater than about 0.5, or greater than about 0.7, or greater than about 0.9. The visible reflective haze ratio is a ratio of an average visible diffusive reflectance to an average visible total reflectance. In some examples, wavelength selective scattering layer 16 may transmit less than about 50% of incident visible light. In some examples, wavelength selective scattering layer 16 may transmit greater than about 50% of incident near-infrared light. In some examples, wavelength selective scattering layer 16 may transmit less than about 50% of incident visible light, and transmit greater than about 50% of incident near-infrared light. In some examples, wavelength selective scattering layer 16 may scatter greater than about 50% of incident visible light. For example, wavelength selective scattering layer 16 may transmit less than about 50% of incident visible light by scattering more than about 50% of incident visible light. In some examples, wavelength selective scattering layer 16 may scatter greater than about 50% of incident visible light as white light.

Figure 2:
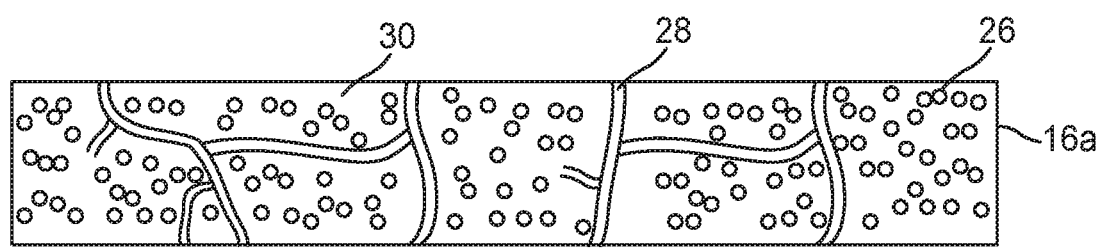
FIG. 2 is a conceptual lateral cross-sectional view of an example wavelength selective scattering layer including one or both of a plurality of particles and a plurality of interconnected voids.

FIG. 2 is a conceptual lateral cross-sectional view of an example wavelength selective scattering layer 16a including one or both of a plurality of particles 26 and a plurality of interconnected voids 28. For example, wavelength selective scattering layer 16a may include a plurality of particles 26 with respective predetermined refractive indices, dispersed in a medium, as shown in FIG. 2. In some examples, the medium may include a binder 30. Binder 30 may include glass, polymer, ceramic, metal, alloy, or any other component that binds plurality of particles 26. In some examples, plurality of particles 26 may include a plurality of nanoparticles, for example, titanium dioxide nanoparticles. In examples in which wavelength selective scattering layer 16a includes nanoparticles, the ratio of the nanoparticles to the binder by weight may be at least 50%, or at least 60%, or at least 75%. In some examples in which wavelength selective scattering layer 16a includes nanoparticles, the thickness of the wavelength selective scattering layer may be at least 0.25 microns, or at least 0.35 microns, or at least 0.5 microns. In some examples in which wavelength selective scattering layer 16a includes nanoparticles, wavelength selective scattering layer 16 may have a narrowband near-infrared scattering ratio of less than about 0.6. For example, the narrowband near-infrared scattering ratio may be a ratio of near-infrared scattering at 940 nm to an average visible scattering at wavelengths between 400 nm and 700 nm. In some examples, the narrowband near-infrared scattering ratio may be less than about 0.4, or less than about 0.3. In some examples in which wavelength selective scattering layer 16a includes nanoparticles, the wavelength selective scattering layer 16a may have a diffuse reflected color L value of greater than 90.

In some examples, wavelength selective scattering layer 16 may include a beaded diffuser layer. For example, wavelength selective scattering layer 16 may include a medium and beads dispersed in the medium. The medium of the beaded diffuser layer may include glass, polymer, or any other suitable optical medium, or combinations thereof. The beads may include silica, glass, polymeric, organic, inorganic, metal oxide, polystyrene, or other suitable scattering materials, or combinations thereof. The diffuser layer may include pores including a gas such as air. In some examples, the pores including gas may be encapsulated in beads.

Wavelength selective scattering layer 16 may include an optical medium have a first refractive index. The optical medium may include plurality of particles 26. As described elsewhere in the disclosure, wavelength selective scattering layer 16 may also include voids, for example, plurality of particles 26 and voids. In some examples, wavelength selective scattering layer 16 may include plurality of particles 26 while including no voids or substantially none voids. The plurality of particles may have a second refractive index such that an absolute difference between the first refractive index and the second refractive index is less than about 0.1. In some examples, the plurality of particles may have an average particle size of less than about 5 µm, and the absolute difference between the first and second refractive indices may be less than about 0.1. In some examples, the plurality of particles may have an average particle size of less than about 1 µm, and the absolute difference between the first and second refractive indices may be less than about 0.2. In some examples, the plurality of particles may have an average particle size of less than about 0.5 µm, and the absolute difference between the first and second refractive indices may be less than about 0.4. In some examples, the plurality of particles may have an average particle size of less than about 0.3 µm, and the absolute difference between the first and second refractive indices may be less than about 0.6. In some examples, the plurality of particles may have an average particle size of less than about 0.2 µm, and the absolute difference between the first and second refractive indices may be less than about 1.8.

In some examples, an average particle size of the plurality of particles, the first refractive index, and the second refractive index are selected from a region under line 82 of FIG. 12, described below. Thus, the near-infrared scattering ratio of wavelength selective scattering layer 16 may be less than 0.2. In some examples, an average particle size of the plurality of particles, the first refractive index, and the second refractive index are selected from a region under line 84 of FIG. 12. Thus, the near-infrared scattering ratio of wavelength selective scattering layer 16 may be less than 0.4. In some examples, an average particle size of the plurality of particles, the first refractive index, and the second refractive index are selected from a region under line 86 of FIG. 12. Thus, the near-infrared scattering ratio of wavelength selective scattering layer 16 may be less than 0.6. In some examples, an average particle size of the plurality of particles, the first refractive index, and the second refractive index are selected from a region under line 88 of FIG. 12. Thus, the near-infrared scattering ratio of wavelength selective scattering layer 16 may be less than 0.8. In some examples, the near-infrared scattering ratio of wavelength selective scattering layer 16 may be less than 0.7, or may be less than 0.5. In some examples, the region under respective lines 82, 84, 86, 88 or any other region may be bounded by a lower particle size bound. For example, the region may only include particle sizes above 10 nm, or 30 nm, or 50 nm, or particle sizes greater than particle sizes at which Rayleigh scattering may manifest or predominate.

In some examples, wavelength selective scattering layer 16 may have a total visible reflectance of less than 50%. In some examples, wavelength selective scattering layer 16 may have a total visible reflectance of at least 50%, or at least 60%, or at least 70%. In some examples, the total visible reflectance may be less than 50%, and wavelength selective scattering layer 16 may conceal objects by visible haze. In some examples, the total visible reflectance may be greater than 50%, and wavelength selective scattering layer 16 may conceal objects by a combination of visible reflection and visible haze. In some examples, wavelength selective scattering layer 16 may have an average near-infrared scattering of less than 60%, or less than 40%. In some examples, the wavelength selective scattering layer may have an average visible scattering of greater than 10%, or greater than 25%, or greater than 58%. In some examples, a difference between the % total visible reflectance and the % diffuse visible reflectance of wavelength selective scattering layer 16 may be less than 20. In some examples, the wavelength selective scattering layer may have an average near-infrared scattering of less than 40%, and an average visible scattering of greater than 58%, and the difference between the % total visible reflectance and the % diffuse visible reflectance may be less than 18.

In some examples, wavelength selective scattering layer 16 may have a visible haze of at least 15%, or at least 25%, or at least 35%, or at least 50%. In some examples, optical filter 12a may include surface optical microstructures, such as microreplicated surface structures, for example, one or more of prisms, lenses, lenslets, or microstructures defined by other geometries.

In some examples, article 10a may include an absorbing layer (not shown in FIG. 1A) between wavelength selective reflecting layer 18 and wavelength selective scattering layer 16, or above wavelength selective scattering layer 16, or positioned adjacent any layer in article 10a. The absorbing layer may include a spectrally selective dye or pigment that may be transmissive or clear in near-infrared and neutral in visible, such that it reduces the visible reflection of the reflective layer 16. In some examples, the dye layer may have at least 30%, 50%, 70%, or 90% absorption. In some examples, the dye layer could be colored, so that it has a visible color, while remaining transmissive in near-infrared.

In some examples, optical filter 12a may include one or both of a protective coating or a sealant layer adjacent or on a major surface of optical filter 12a. In some examples, the protective coating or sealant layer may protect the integrity of a layer of optical filter 12a, for example, wavelength selective scattering layer 16, for example, by preventing or reducing the intrusion of moisture or other reactants or disintegrants. The protective layer or the sealant layer may also provide structural support and physical stability to a layer of optical filter 12a or optical filter 12a as a whole. In some examples, the sealant layer may include a latex coating. In some examples, the protective coating may include one or more of glass, metal or alloy, polymer, paper, or fabric. In some examples, the protective coating may include a coating deposited by plasma deposition, vapor deposition, physical vapor deposition, chemical vapor deposition, or another suitable technique.

In some examples, wavelength selective scattering layer 16a may include a layer including binder 30, plurality of particles 26, and a plurality of interconnected voids 28, for example, as shown in FIG. 2. A volume fraction of the plurality of interconnected voids in the optical filter may not less than about 20%. A weight ratio of the binder to the plurality of the particles may not be less than about 1:2.

Figure 1B:
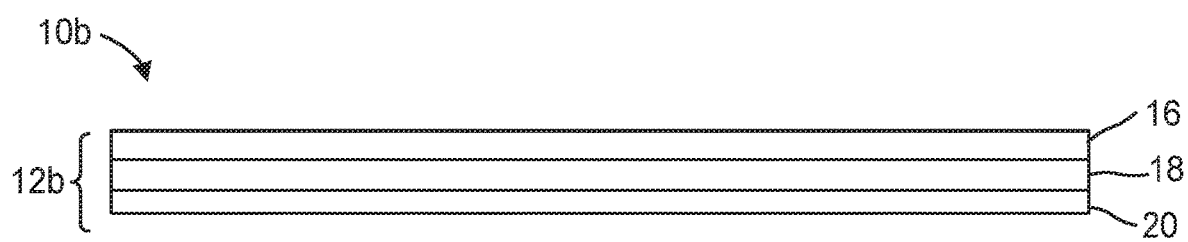

FIG. 1B shows a lateral cross-sectional view of an example article 10b. Article 10b may include an optical filter 12b including substrate 14, wavelength selective scattering layer 16, wavelength selective reflecting layer 18, and a broadband reflecting layer 20. Broadband reflecting layer 20 may include one or more of a multilayer optical film, a dichroic reflector, an interference film, an inorganic multilayer stack, a metal dielectric stack, a polished substrate, a mirror, a reflective polarizer, a retroreflective film or substrate, or a reflective surface such as a reflective metal or glass surface, or any wavelength selective layer. In examples in which broadband reflecting layer 20 includes a retroreflective film or substrate, the retroreflective film or substrate may include optical features that result in retroreflection, for example, cube corner elements or beads.

While wavelength selective reflecting layer 18 is shown between wavelength selective scattering layer 16 and broadband reflecting layer 20 in article 10b, in some examples, article 10b may not include wavelength selective reflecting layer 18, and wavelength selective scattering layer 16 may be disposed on broadband reflecting layer 20. In some examples, substrate 14 may include broadband reflecting layer 20, for example, at a major surface or within an interior of substrate 14. In some examples, broadband reflecting layer 20 may be disposed below substrate 14. In some examples, broadband reflecting layer 20 may be disposed above substrate 14. In some examples, broadband reflecting layer 20 may be perforated. In some examples, article 10b may reflect less than 50% of visible light, and transmit more than 50% of near-infrared light. In some examples, broadband reflecting layer 20 may compensate for a color deviation either independently, or in conjunction with, one or both of wavelength selective scattering layer 16 or wavelength selective reflecting layer 18. For example, broadband reflecting layer 20 may reflect wavelengths in a broad visible band that may be scattered by wavelength selective scattering layer 16. At least some wavelengths of the broad visible band may be transmitted by wavelength selective reflecting layer 16 and scattered by wavelength selective scattering layer 16. In some examples, broadband reflecting layer 20 may have a predetermined reflection band configured to compensate for a color deviation in light emitted by the light emitter or received by the light receiver. In some examples, the predetermined reflection band may be configured to compensate for the color deviation by shifting a scattered color towards a predetermined reference color. In some examples, the reference color may be associated with predetermined L, a, and b color values. In some examples, the reference color may be a white color. In some examples, the predetermined reflection band of broadband reflecting layer 20 includes a lower band edge that is a first visible wavelength and an upper band edge that is a second visible wavelength. In some examples, one or both of the first and the second visible wavelengths may be between about 400 nm and about 800 nm.

Figure 1C:

FIG. 1C shows a lateral cross-sectional view of an example article 10c. Article 10c may include an example optical filter 12c including wavelength selective scattering layer 16, wavelength selective reflecting layer 18, and a low-index layer 22. Article 10c may optionally include broadband reflecting layer 20, adjacent a predetermined layer or between predetermined layers of optical filter 12c. Article 10c may also include substrate layer 14 adjacent a predetermined layer of optical filter 12c.

In some examples, low-index layer 22 is configured to reduce a color deviation in light emitted by a light emitter or received by a light receiver, or otherwise received by optical filter 12c. In some examples, low-index layer 22 may be configured to compensate for the color deviation by promoting total internal reflection within wavelength selective reflecting layer 18. In some examples, low-index layer 22 may be configured to compensate for the color deviation by reducing light leakage through wavelength selective reflecting layer 18.

Low-index layer 22 may include any optical layer having a low refractive index, for example, a refractive index lower than 1.35, lower than 1.30, lower than 1.25, or lower than 1.20, or lower than 1.15. In some examples, low-index layer 22 may include a gel ultra-low-index (ULI) material described elsewhere in the disclosure. While in the example shown in FIG. 1C, optical filter 12c includes wavelength selective reflecting layer 18 between wavelength selective scattering layer 16 and low-index layer 22, in other examples, optical filter 12c may include low-index layer 22 between wavelength selective reflecting layer 18 and wavelength selective scattering layer 16, or adjacent or between any other layers of optical filter 12c.

Figure 1D:

FIG. 1D shows a lateral cross-sectional view of an example article 10d. Article 10d may include an example optical filter 12d including wavelength selective scattering layer 16, wavelength selective reflecting layer 18, and a wavelength selective absorbing layer 24. Article 10d may optionally include one or both of broadband reflecting layer 20 and low-index layer 22, adjacent a predetermined layer or between predetermined layers of optical filter 12d. Article 10d may also include substrate layer 14 adjacent a predetermined layer of optical filter 12d.

Wavelength selective absorbing layer 24 may include a dye or a pigment capable of having a predetermined absorption band or spectrum. In some examples, wavelength selective absorbing layer 24 may selectively absorb visible wavelengths, for example, appearing black. In other examples, wavelength selective absorbing layer 24 may substantially transmit visible wavelengths, while absorbing near-infrared or infrared wavelengths. In some examples, the dye or pigment may include a dye or pigment that has a greater infrared transmittance than a visible transmittance, for example, a near-infrared black ink that substantially absorbs visible wavelengths while transmitting near-infrared wavelengths. For example, wavelength selective absorbing layer 24 may include dyes or inks such as Spectre™ inks, for example Spectre™ 100, 110, 120, 130, 140, 150, or 160 (Epolin, Newark, N.J.); Mimaki inks, for example Mimaki ES3, SS21, BS3, SS2, or HS (Mimaki Global, Tomi-city, Nagano, Japan); or Seiko inks, for example Seiko 1000, 1300, SG700, SG740, or VIC (Seiko Advance Ltd., Japan). In some examples, wavelength selective absorbing layer 24 may include one or more of cyan, magenta, yellow, or black dye components, or may include a dye having any desired color, for example, by scattering or reflecting a predetermined wavelength band, peak, or spectrum associated with a predetermined color. In some examples, wavelength selective absorbing layer 24 nay include at least one of a wavelength selective dye, a wavelength selective pigment, a spectral downconverter, or a fluorescent species. In some examples, the downconverter may include quantum dots.

In some examples, wavelength selective absorbing layer 24 may include a spectrally selective multilayer absorbing film that may have a greater infrared transmittance than a visible transmittance. In some examples, a color of wavelength selective absorbing layer 24 may be selected to tune the appearance of the article 10d as a whole, for example, to tune the reflected or scattered wavelengths so as to modify the apparent color of the article 10d exhibited by a major surface of the article 10d. Wavelength selective absorbing layer 24, while blocking visible wavelengths, may transmit at least some, or substantially all, near-infrared wavelengths.

In some examples, wavelength selective absorbing layer 24 may include a separate coating including one or both of a dye or a pigment. In some examples, wavelength selective absorbing layer 24 may not include a dye, and may include a near-infrared transmissive visible blocking pigment. For example, wavelength selective absorbing layer 24 may include Lumogen® Black FK 4280 or Lumogen Black FK 4281 (BASF, Southfield, Mich.).

In some examples, wavelength selective absorbing layer 24 may include a multilayer film, one or more of the layers of the multilayer film including one or both of a dye or a pigment. In some examples, wavelength selective absorbing layer 24 may include or be an adhesive layer, a polymer layer, a skin layer, or any other layer of a multilayer film that includes a dye or a pigment. In some examples, article 10d may not include a separate wavelength selective absorbing layer 24, and instead may include a wavelength selective dye or a pigment in any other suitable layer. In some examples, wavelength selective absorbing layer 24 or any other layer of article 10d may only include dye or pigment in a predetermined pattern or region. In some examples, the wavelength selective absorbing layer 24 may exhibit broadband absorption, for example, absorption over a predetermined wavelength band, by including one or more absorbing dyes or pigments that absorb at least a respective sub-band of the predetermined wavelength band.

Figure 1E:
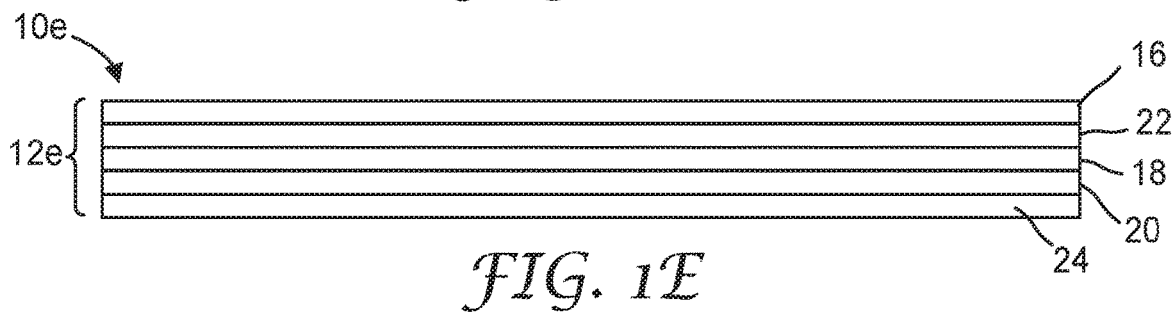

While in the example shown in FIG. 1D, optical filter 12D includes wavelength selective reflecting layer 18 between wavelength selective scattering layer 16 and wavelength selective absorbing layer 24, in other examples, optical filter 12d may include wavelength selective absorbing layer 24 at other positions, for example, as shown in FIG. 1E. For example, wavelength selective absorbing layer 24 may be disposed between wavelength selective reflective layer 18 and wavelength selective scattering layer 16. Including wavelength selective reflective layer 18 positioned between wavelength selective scattering layer 16 and wavelength selective absorbing layer 24 may reduce a total visible reflectance uniformly over an area of a major surface of the article 10d, without substantially reducing a total near-infrared transmittance. The uniform reduction in total visible reflectance may be used to reduce or prevent wet-out. Wet-out is a phenomenon that may arise from visible light leakage or transmission of visible light through all layers of article 10h, which may result in the appearance of visible discontinuities, disruptions, aberrations, variations, or disturbance in the uniform appearance of an optical filter. For example, regions at which an optical filter contacts an underlying substrate, may exhibit wet-out, whereby a shape corresponding to the region of contact may be perceptible through the optical filter. Wavelength selective absorbing layer 24 may uniformly reduce visible reflectance over an entire area of the article 10d, and prevent visible light leakage, while still allowing near-infrared wavelengths to be transmitted, such that no discontinuities or disturbances are visible across a major surface of the article 10d, thus avoiding wet-out.

In some examples, wavelength selective absorbing layer 24 may be between wavelength selective scattering layer 16 and wavelength selective reflecting layer 18. Positioning the wavelength selective absorbing layer 24 behind wavelength selective scattering layer 16 may be used to tune the grey scale or apparent whiteness of wavelength selective scattering layer 16. As discussed above, wavelength selective absorbing layer 24 may include a non-neutral color to tune visual appearance, for example, a color coordinate in a predetermined color space. In some examples, wavelength selective absorbing layer 24 may reduce a total visible reflectance of the optical filter by a predetermined magnitude without substantially reducing a total near-infrared transmittance. While example article 10e includes a separate wavelength selective absorbing layer 24, in some examples, a wavelength selective dye may be added to wavelength selective scattering layer 16 so that wavelength selective scattering layer 16 also acts as an absorbing layer. In some examples, wavelength selective scattering layer 16 may be disposed on top of another dyed wavelength selective scattering layer 16.

FIG. 1E shows a lateral cross-sectional view of example article 10e. Article 10e may include an optical filter 12e including wavelength selective scattering layer 16, wavelength selective reflecting layer 18, low-index layer 22, broadband reflector 18, and wavelength selective absorbing layer 24. In the example shown in FIG. 1E, low-index layer 22 is between wavelength selective scattering layer 16 and wavelength selective reflecting layer 18, wavelength selective reflecting layer 18 is between low-index layer 22 and broadband reflecting layer 20, and broadband reflecting layer 20 is between wavelength selective reflecting layer 18 and wavelength selective absorbing layer 24. In some examples, article 10e may not include wavelength selective scattering layer 18. In some examples, article 10e may include broadband reflecting layer 20 adjacent wavelength selective scattering layer 16 and wavelength selective absorbing layer 24. In some such examples, broadband reflecting layer 20 may include a retroreflective film, and wavelength selective absorbing layer 24 may include an NIR absorber for reducing NIR retroreflectivity. For example, the NIR retroreflectivity of an example optical filter including a retroreflective film and wavelength selective absorbing layer 24 may be lower by at least 50%, or at least 60%, or at least 75%, or more, of the NIR retroreflectivity of the example optical filter without wavelength selective absorbing layer 24. Such example optical filters may maintain retroreflectivity lower than a predetermined threshold, preventing saturation of sensors detecting retroreflected light.

In some examples, one or more of substrate 14, wavelength selective scattering layer 16, wavelength selective reflective layer 18, broadband reflecting layer 20, low-index layer 22, or wavelength selective absorbing layer 24 may include one or both of beads or particles and voids to exhibit diffusing or scattering. For example, one or more respective layers may include a medium and beads or particles dispersed in the medium. The medium may include glass, polymer, or any other suitable optical medium, or combinations thereof. The beads or particles may include silica, glass, polymeric, organic, inorganic, metal oxide, polystyrene, or other suitable scattering materials, or combinations thereof. The medium may include diffusive or scattering voids or pores, and the voids or pores may include a gas such as air. In some examples, the medium may include both particles and voids. In some examples, the medium may not include either particles or voids.

One or more of respective wavelength selective layers (16, 18, 22, or 24) may selectively transmit near-infrared wavelengths. For example, one or more of the wavelength selective layers, or the article 10e as a whole may have a near-infrared transmittance, for example, transmittance at wavelengths greater than 830 nm, of greater than 5%, or greater than 10%, or greater than 20%, of greater than 50%, or greater than 7%. In some examples, article 10e may transmit less than 5%, or less than 1%, or about 0. In some examples, article 10e may have a near-infrared transmittance of greater than 10% for wavelengths greater than 830 nm. In some examples, article 10e may have a near-infrared transmittance of greater than 20% for wavelengths greater than 850 nm. In some examples, article 10e may have a near-infrared transmittance of greater than 50% for wavelengths greater than 870 nm. In some examples, article 10e may have a near-infrared transmittance of greater than 50% for wavelengths greater than 900 nm. In some examples, article 10e may have an average near-infrared transmittance of greater than 75% for wavelengths greater than 900 nm.

While FIGS. 1A-1E show respective articles 10a-10e as including selected layers from one or more of wavelength selective scattering layer 16, wavelength selective reflecting layer 18, broadband reflective layer 20, low-index layer 22, and wavelength selective absorbing layer 24, other example articles according to the disclosure may include wavelength selective scattering layer 16 in combination with one or more of wavelength selective reflecting layer 18, broadband reflective layer 20, low-index layer 22, and wavelength selective absorbing layer 24. Further, while particular positions of one or more of wavelength selective scattering layer 16, wavelength selective reflecting layer 18, broadband reflective layer 20, low-index layer 22, and wavelength selective absorbing layer 24 are illustrated in the examples described with reference to FIGS. 1A-1E, in other examples, one or more of the layers may be rearranged, duplicated, or replicated to prepare other example articles and optical filters. While some layers may be described as being adjacent to other layers, layers that are adjacent may include layers defining major surfaces that are within a predetermined distance of each other, for example, less than 1 cm apart, or less than 1 mm apart, or less than 0.1 mm apart, adjacent layers may include layers that contact each other, or are bonded or adhered to each other, or separated by an interface medium, for example air or any optical medium, or layers that are in optical communication.

While FIGS. 1A-1E show respective articles 10a-10e as including flat layers, in various examples, articles 10a-10e may assume any suitable shape, periphery, or cross-section, and layers in articles 10a-10e may assume a regular, irregular, or compound curvature, or may assume flat or curved geometries in different regions, or otherwise conform to a contour of a substrate beneath the layers or the articles 10a-10e. For example, articles 10a-10e may assume a hemispherical or lenticular shape, or a surface with an irregular contour. In some examples, one or more of the respective wavelength selective layers, for example, wavelength selective scattering layer 16, wavelength selective reflecting layer 18, broadband reflective layer 20, low-index layer 22, and wavelength selective absorbing layer 24 may have a shape or thickness that varies across a major dimension, for example, by having a spatially variant or periodic pattern that covers at least some area of substrate 14 or an underlying layer, from about 1 to about 100% area.

Further, while in some examples described above, articles 10a-10e of FIGS. 1A-1E may include substrate 14, in other examples, articles 10a-10e may not include substrate 14. In some examples, substrate 14 may be flexible or conformable. In some examples, articles 10a-10e may be flexible and may be disposed on a flexible substrate 14. In some examples, articles 10a-10e may be continuously flexible or only be flexible in predetermined regions. In some examples, substrate 14 may be partly or substantially rigid. In some examples, substrate 14 may include a light source, a sensor, or a photovoltaic cell.

In some examples, articles 10a-10e may be used in combination with a retroreflective film or substrate. For example, an example system may include a sign, a pavement marking, or a conspicuity marker, including one or more of articles 10a-10e and a retroreflective film or substrate. In some examples, articles 10a-10e may include NIR machine-readable indicia or patterns, for example, a bar code, a QR code, a logo, a sign, or any other pattern conveying, encoding, or containing machine-readable information.

Thus, example articles according to examples described with reference to FIGS. 1A-1E and FIG. 2 may include optical filters that compensate for a color deviation. Example articles and optical filters may be used in example optical systems described below.

Figure 3A:
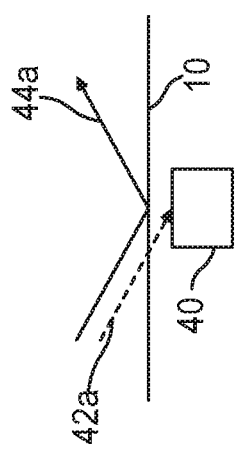
FIGS. 3A-3F are conceptual and schematic diagrams of example systems including example optical filters.

FIGS. 3A-3F are conceptual and schematic diagrams of example optical systems including an optical filter. FIG. 3A is a conceptual and schematic diagrams of an example optical system including an optical filter 10 and a light receiver 40. In some examples, light receiver 40 may include a light sensor, camera, CCD, or any other sensor configured to sense at least a predetermined wavelength region of light. For example, light receiver 40 may include a near-infrared sensor. In some examples, light receiver 40 may include an object that receives light, for example, a solar cell, or an object that at least partially absorbs incident light, for example, a solar heater or any other object that receives light. In some examples, light receiver 40 may include an object capable of at least sensing visible light, for example, an eye. The optical filter 10 may include any of the example optical filters including a wavelength selective scattering layer, as discussed above with reference to FIGS. 1A-1E, or other example optical filters described in the disclosure. As shown in FIG. 3A, optical filter 10 may be disposed adjacent light receiver 40. An incident near-infrared ray 42a may include a near-infrared wavelength, and may be substantially transmitted through optical filter 10 to light receiver 40. An incident visible ray 44a may include a visible wavelength and may be substantially reflected or scattered by optical filter 10, so that light receiver 40 is at least partially shielded from visible ray 44a, while at least partially receiving near-infrared ray 42a. In some examples, light receiver may be substantially or completely shielded from visible ray 44a by optical filter 10, and may receive substantially all of near-infrared ray 42a.

Figure 3B:
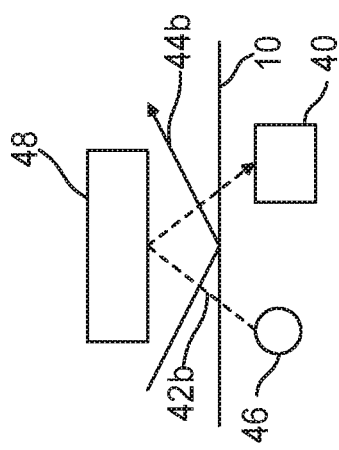

FIG. 3B is a conceptual and schematic diagrams of an example optical system including optical filter 10, light receiver 40, a light emitter 46, and an object 48. In some examples, light emitter 46 may include a source of any suitable wavelength of light or electromagnetic radiation, including visible, near-infrared, or ultraviolet wavelengths. In some examples, light emitter 46 may include a bulb, an incandescent light source, compact fluorescent light, LEDs, a light guide, or any natural or artificial sources of light. In some examples, light emitter 46 may not generate light, and may only reflect or transmit light generated by a light source. The optical filter 10 may be disposed between light receiver 40 and object 48. The light emitter may be disposed on the same side of optical filter 10 as light receiver 40. A near-infrared ray 42b transmitted from light emitter 46 may include a near-infrared wavelength, and may be substantially transmitted through optical filter 10 to object 48. The ray 42b may be reflected back by object 48, and the reflected ray may be modified by optical properties of object 48. In some examples, object 48 may include a retroreflective film, surface, or substrate, or may be otherwise be a retroreflecting object. The reflected ray 42 may be substantially transmitted through optical filter 10 to light receiver 40. An incident visible ray 44b may include a visible wavelength and may be substantially reflected or scattered by optical filter 10, so that one or both of light receiver 40 and light emitter 46 are at least partially shielded from visible ray 44*a*. In some examples, light receiver may be substantially or completely shielded from visible ray 44*b* by optical filter 10, and may receive substantially all of near-infrared ray 42*b*.

Figure 3C:
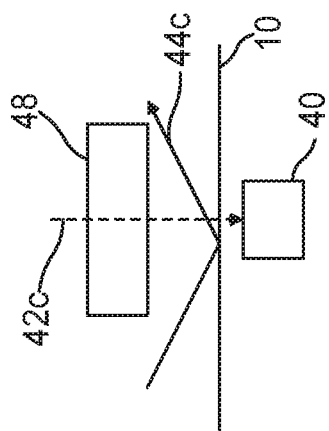

FIG. 3C is a conceptual and schematic diagrams of an example optical system including optical filter 10, light receiver 40, and object 48. Optical filter 10 may be disposed between light receiver 40 and object 48. An incident near-infrared ray 42*c* may include a near-infrared wavelength, and may be substantially transmitted through object 48 and optical filter 10 to light receiver 40. An incident visible ray 44*c* may include a visible wavelength and may be substantially reflected or scattered by optical filter 10, so that light receiver 40 is at least partially shielded from visible ray 44*c*, while at least partially receiving near-infrared ray 42*c*. In some examples, light receiver 40 may be substantially or completely shielded from visible ray 44*c* by optical filter 10, and may receive substantially all of near-infrared ray 42*c*.

Figure 3D:
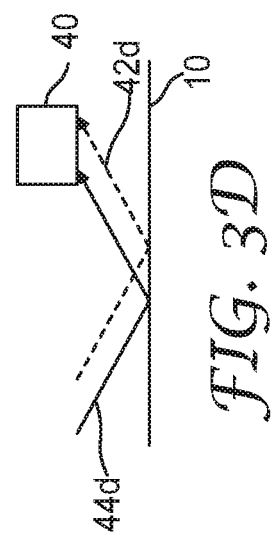

FIG. 3D is a conceptual and schematic diagrams of an example optical system including optical filter 10 and light receiver 40. The optical filter 10 may be disposed adjacent light receiver 40. An incident near-infrared ray 42*d* may include a near-infrared wavelength, and may be substantially reflected off optical filter 10 to light receiver 40. An incident visible ray 44*d* may include a visible wavelength and may be substantially reflected or scattered by optical filter 10, so that light receiver 40 at least partially receives visible ray 44*d*, while at least partially receiving near-infrared ray 42*d*.

Figure 3E:
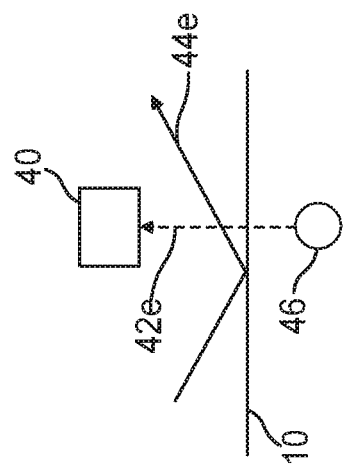

FIG. 3E is a conceptual and schematic diagrams of an example optical system including optical filter 10, light receiver 40, and light emitter 46. The optical filter 10 may be disposed between light emitter 46 and light receiver 40. A near-infrared ray 42*e* transmitted from light emitter 46 may include a near-infrared wavelength, and may be substantially transmitted through optical filter 10 to light receiver 40. An incident visible ray 44*e* may include a visible wavelength and may be substantially reflected or scattered by optical filter 10, so that light emitter 46 is at least partially shielded from visible ray 44*e*. In some examples, light emitter 46 may be substantially or completely shielded from visible ray 44*e* by optical filter 10. While light receiver 40 is described in the example optical system of FIG. 3E, in some examples, the example optical system of FIG. 3E may not include a light receiver 40. For example, the example optical system may include light emitter 46 and optical filter 10, and optical filter 10 may conceal light emitter 46 from visible appearance.

Figure 3F:
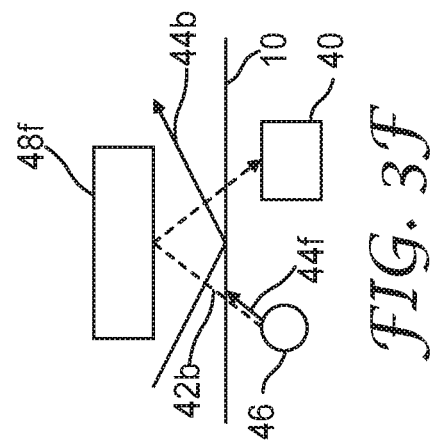

FIG. 3F is a conceptual and schematic diagrams of an example optical system including optical filter 10, light receiver 40, a light emitter 46, and an object 48*f*. In some examples, light emitter 46 may include a source of near-infrared wavelengths, for example, a near-infrared bulb or LED. For example, light emitter 46 may include a laser, a laser diode, or an injection laser. The light receiver 40 may include a sensor or camera sensitive to near-infrared wavelengths. For example, the sensor may include a gesture sensor, an optical touch sensor, or a photoelectric sensor such as a sensor that detects a disruption in a continuously sensed light beam. The sensor may include an array or any other group of one kind or different kinds of sensors. Optical filter 10 may be disposed between light receiver 40 and object 48*f*. Light emitter 46 may be disposed on the same side of optical filter 10 as light receiver 40. A near-infrared ray 42*b* transmitted from light emitter 46 may include a near-infrared wavelength, and may be substantially transmitted through optical filter 10 to object 48*f*. The ray 42*b* may be reflected back by object 48, and the reflected ray may be modified by optical properties of object 48*f*. In some examples, object 48*f* may include a retroreflective film, surface, or substrate, or may be otherwise be a retroreflecting object. The reflected ray 42 may be substantially transmitted through optical filter 10 to light receiver 40. In some examples, an incident visible ray 44*b* may include a visible wavelength and may be substantially reflected or scattered by optical filter 10, so that one or both of light receiver 40 and light emitter 46 are at least partially shielded from visible ray 44*a*. In some examples, light receiver 40 may be substantially or completely shielded from visible ray 44*b* by optical filter 10, and may receive substantially all of near-infrared ray 42*b*.

In some examples, an iris scanning system may include the example optical system of FIG. 3F, for example, where object 48*f* includes an eye or iris, and light receiver 40 is an iris scanner that receives near-infrared light emitted by light emitter 46 and bounced back by object 48*f*. While light emitter 46 may emit near-infrared wavelengths, light emitter 46 may also emit visible wavelengths that may reveal the presence of light emitter 46, for example, to a user or viewer. While articles including a wavelength selective layer 16 may be used to block the transmission of visible wavelengths to camouflage light emitter 46 from a visible perception, wavelength selective reflective layer 16 may allow some visible wavelengths, for example, peaks or bands of visible wavelengths, to be transmitted. In some examples, optical filter 10 may include wavelength selective absorbing layer 24 that blocks the transmission of visible wavelengths transmitted by the wavelength selective reflective layer 16, as discussed above with reference to FIGS. 1*d* and 1*e*. Thus, in some examples, optical filter 10 may have a visible transmittance at 380-800 nm of less than 0.1% and a near-infrared transmittance at 830-900 nm of greater than 50%. Therefore, optical filter 10 may camouflage light emitter 46 from visible perception, even if light emitter 46 emits visible wavelengths, while allowing the iris scanning system to scan the iris by transmitting near-infrared wavelengths in both directions across optical filter 10. In some examples, the example optical system of FIG. 3F may include more than one optical filter 10. For example, a first optical filter may be disposed adjacent light emitter 46 or light receiver 40, and a second optical filter may be disposed adjacent a major surface of object 48*f*. In some examples, the first and second optical filter respective include the same or different optical filters. In some examples, optical filter 10 may include a retroreflective film or may be disposed across or along a retroreflective path. In some examples, object 48*f* may include a retroreflective film. While an iris scanning system is described above with reference to FIG. 3F, in some examples, the example of FIG. 3F may include any biometric or identification system that uses near-infrared wavelengths for identification, while emitting visible wavelengths to be concealed or camouflaged from a visible perception. For example, the example system of FIG. 3F may include a fingerprint scanner, a facial recognition system, or a thermal recognition system.

In some examples, optical filter 10 may include at least one removable or repositionable layer, or optical filter 10 as a whole may be removable or repositionable, so that it can be removed or repositioned relative to a substrate underneath or adjacent optical filter 10. In some examples, the periphery of optical filter 10 may extend beyond the periphery of one or both light emitter 46 or light receiver 40, or the area of a major surface of optical filter 10 may be greater or smaller than a surface area of one or both of light emitter 46 or light receiver 40. In some examples, optical filter 10 may be configured to camouflage other components, such as electronics, circuitry, substrates, sensors, transmitters by shielding those components by optical filter 10 from a visual perception. In some examples, more than one light emitter 46 or light receiver 40, for example, an array, could be positioned adjacent optical filter 10. In some examples, one or both of light emitter 46 or light receiver 40 may be relatively adjacent to optical filter 10, for example, less than 1 m away, less than 10 cm away, less than 1 cm away, less than 1 mm away, or in contact with, adhered to, attached to, or bonded to optical filter 10. In some examples, an air interface between one or both of light emitter 46 or light receiver 40 may be minimized or eliminated, preventing reflections at air interfaces. In some examples, one or both of light emitter 46 or light receiver 40 may be relatively remote from optical filter 10, for example, at least 1 cm away, or 10 cm away, or 1 m away or, 10 m away, or 100 m away, or 1 km away, or even further remote. While a direct path for light is shown in FIGS. 3A-3F, for example, between one or both of light emitter 46 and light receiver 40 and optical filter 10, In some examples, light between one or both of light emitter 46 and light receiver 40 and optical filter 10 may follow indirect paths, including optically guided paths, reflected paths, or paths including optical manipulation including refraction or filtering, or paths that travel through different optical media.

Thus, in some examples, optical filter 10 may be configured to at least partially shield light receiver 40 from visible wavelengths while substantially allowing light receiver 40 to receive near-infrared wavelengths. For example, optical filter 10 may be configured to conceal or camouflage one or more of light receiver 40, light emitter 46, or object 48. In some examples, optical filter 10 may be configured to camouflage one or both of light receiver 40 or light emitter 46 from a visual perception, for example, by scattering visible wavelengths as discussed above with reference to FIGS. 3A-3F. Further, in some examples, optical filter 10 may be configured to compensate for a color deviation of a light received at optical filter 20, or received by light receiver 40, or emitter by light emitter 46.

Figure 4:
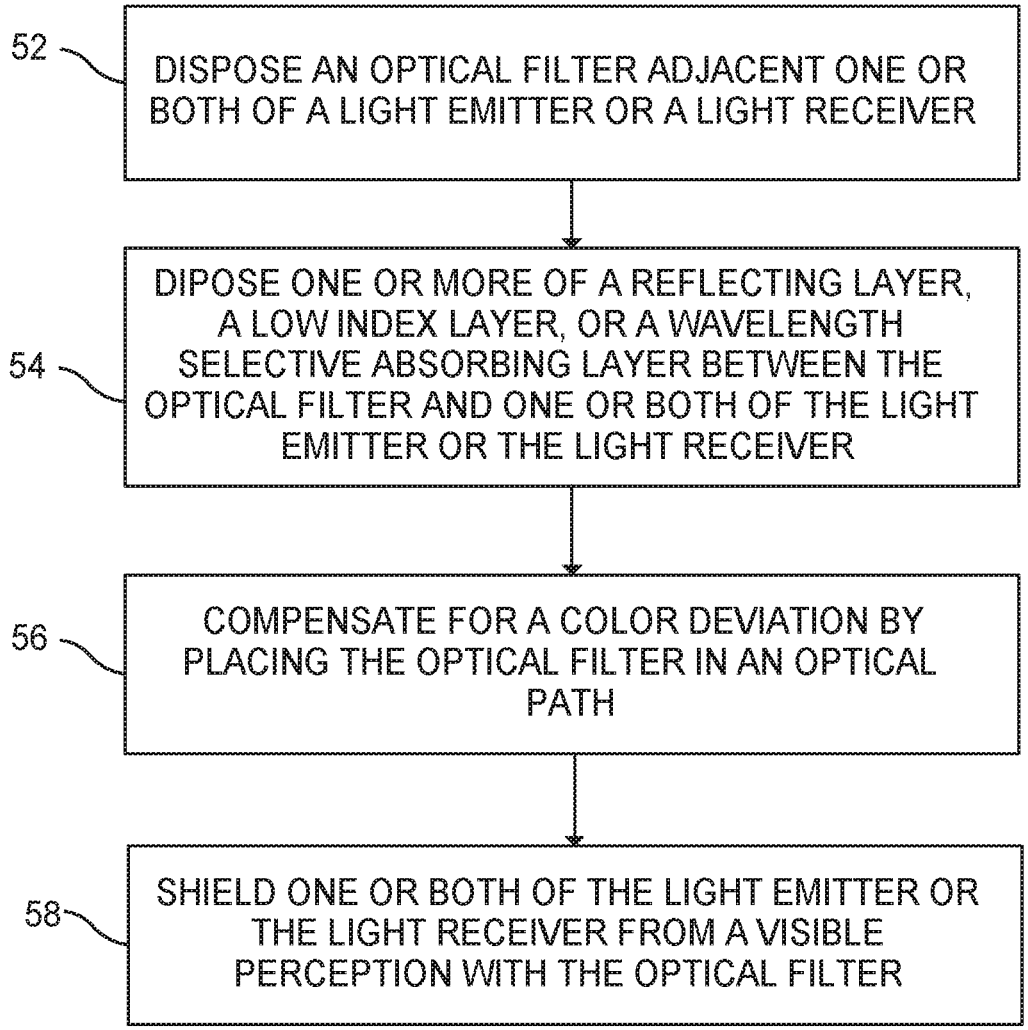
FIG. 4 is a flowchart of an example technique for compensating for a color deviation using an example optical filter.

For example, FIG. 4 is a flowchart of an example technique for compensating for a color deviation using an example optical filter. The example technique may include disposing optical filter 10 adjacent one or both of light emitter 46 or light receiver 40 (52). Optical filter 10 includes wavelength selective scattering layer 16, as discussed above with reference to FIGS. 1A-1E. The example technique may optionally further include disposing one or more of wavelength selective reflecting layer 18, broadband reflecting layer 20, low-index layer 22, or wavelength selective absorbing layer 24, between optical filter 10 and one or both of light emitter 46 or light receiver 40 (54). The example technical may include compensating for a color deviation by placing optical filter 10 in an optical path, for example, an optical path originating from or terminating at light emitter 40 or light receiver 46, or from any optical source or target (56). Optical filter 10 may compensate for a color deviation by modifying the spectrum of light passing received at or passing through optical filter 10, emitted by light emitter 46 or received by light receiver 40 (56). The example technique may optionally include shielding one or both of light emitter 40 or the light receiver 46 from visible wavelengths (58) using optical filter 10, for example, by placing optical filter 10 in an optical path originating from or terminating at light emitter 40 or light receiver 46.

While articles described above may include multilayer films or may include multiple layers, in some examples, one or more layer may be blended into an adjacent layer, or may form a visibly indistinct graded boundary with an adjacent layer. In some examples, the multilayer films or articles may be processed such that no discernible boundaries or major surfaces separate one or more layers, and different layers may transition into adjacent layers. In some examples, a layer may signify a predetermined substantially planar or curved geometric region rather than a physically distinct or discrete layer.

Thus, example systems, articles, and techniques according to the present disclosure may include example optical articles including example wavelength selective scattering layers that transmit near-infrared light with relatively high clarity while reducing the transmission of visible wavelengths, for example, by selectively scattering or reflecting visible wavelengths.

Example articles and techniques according to the disclosure provide will be illustrated by the following non-limiting embodiments and examples.

EMBODIMENTS

Embodiments of the invention include the following enumerated items.

Item 1. A system comprising:
one or both of a light emitter or a light receiver; and
an optical filter adjacent one or both of the light emitter or the light receiver, wherein the optical filter comprises:
a wavelength selective scattering layer, wherein the wavelength selective scattering layer is configured to scatter visible light; and
a wavelength selective reflecting layer, wherein the wavelength selective reflecting layer has a predetermined transmission band configured to compensate for a color deviation in light emitted by the light emitter or received by the light receiver.

Item 2. The system of item 1, wherein the wavelength selective scattering layer is configured to transmit near-infrared light.

Item 3. The system of items 1 or 2, wherein the predetermined transmission band is configured to compensate for the color deviation by shifting a scattered color towards a predetermined reference color.

Item 4. The system of item 3, wherein the reference color is associated with predetermined L, a, and b color values.

Item 5. The system of item 3, wherein the reference color is a white color.

Item 6. The system of any one of items 1 to 5, wherein the transmission band includes a narrow band centered at a wavelength between about 400 and about 600 nm.

Item 7. The system of any one of items 1 to 6, wherein the wavelength selective reflecting layer has a transmittance below a predetermined threshold between a lower transmission band edge and an upper transmission band edge of the predetermined transmission band, and wherein the wavelength selective reflecting layer has a transmittance above the predetermined threshold beyond the lower and upper transmission band edges.

Item 8. The system of item 7, wherein the wavelength selective reflecting layer substantially transmits no light between the lower transmission band edge and the upper transmission band edge.

Item 9. The system of items 7 or 8, wherein the lower transmission band edge is at less than or about 400 nm and the upper transmission band edge is at greater than or about 800 nm.

Item 10. The system of any one of items 1 to 9, wherein the wavelength selective scattering layer has a near-infrared scattering ratio of less than about 0.9, the near-infrared scattering ratio being a ratio of an average near-infrared scattering to an average visible scattering, and wherein the wavelength selective scattering layer has a visible reflective haze ratio of greater than about 0.5, the visible reflective haze ratio being a ratio of an average visible diffusive reflectance to an average visible total reflectance.

Item 11. The system of item 10, wherein the wavelength selective scattering layer has a near-infrared scattering ratio of less than about 0.7.

Item 12. The system of item 10, wherein the wavelength selective scattering layer has a near-infrared scattering ratio of less than about 0.6.

Item 13. The system of any one of items 10 to 12, wherein the wavelength selective scattering layer has a visible reflective haze ratio of greater than about 0.6.

Item 14. The system of item 13, wherein the wavelength selective scattering layer has a visible reflective haze ratio of greater than about 0.7.

Item 15. The system of any one of items 1 to 14, wherein one or both of the light emitter or the light receiver have an operating wavelength within a near-infrared range.

Item 16. The system of any one of items 1 to 15, wherein the wavelength selective scattering layer transmits less than about 50% of incident visible light, and wherein the wavelength selective scattering layer transmits greater than about 50% of incident near-infrared light.

Item 17. The system of any one of items 1 to 16, wherein the wavelength selective scattering layer scatters greater than about 50% of incident visible light.

Item 18. The system of item 17, wherein the wavelength selective scattering layer scatters greater than about 50% of incident visible light as white light.

Item 19. The system of any one of items 1 to 18, wherein the wavelength selective scattering layer comprises an optical medium have a first refractive index, wherein the optical medium comprises a plurality of particles, wherein the plurality of particles has a second refractive index and an average particle size of less than about 5 µm, and wherein an absolute difference between the first refractive index and the second refractive index is less than about 0.1.

Item 20. The system of any one of items 1 to 18, wherein the wavelength selective scattering layer comprises an optical medium having a first refractive index, wherein the optical medium comprises a plurality of particles, wherein the plurality of particles has a second refractive index and an average particle size of less than about 1 µm, and wherein an absolute difference between the first refractive index and the second refractive index is less than about 0.2.

Item 21. The system of any one of items 1 to 18, wherein the wavelength selective scattering layer comprises an optical medium having a first refractive index, wherein the optical medium comprises a plurality of particles, wherein the plurality of particles has a second refractive index and an average particle size of less than about 0.5 µm, and wherein an absolute difference between the first refractive index and the second refractive index is less than about 0.4.

Item 22. The system of any one of items 1 to 18, wherein the wavelength selective scattering layer comprises an optical medium having a first refractive index, wherein the optical medium comprises a plurality of particles, wherein the plurality of particles has a second refractive index and an average particle size of less than about 0.3 µm, and wherein an absolute difference between the first refractive index and the second refractive index is less than about 0.6.

Item 23. The system of any one of items 1 to 18, wherein the wavelength selective scattering layer comprises an optical medium having a first refractive index, wherein the optical medium comprises a plurality of particles, wherein the plurality of particles has a second refractive index and an average particle size of less than about 0.4 µm, and wherein an absolute difference between the first refractive index and the second refractive index is less than about 1.8.

Item 24. The system of any one of items 1 to 18, wherein the wavelength selective scattering layer comprises a binder, a plurality of particles, and a plurality of interconnected voids, wherein a volume fraction of the plurality of interconnected voids in the wavelength selective scattering layer is not less than about 20%, and wherein a weight ratio of the binder to the plurality of the particles is not less than about 1:2.

Item 25. The system of any one of items 1 to 24, wherein the wavelength selective scattering layer has a visible haze of at least 25%.

Item 26. The system of any one of items 1 to 25, wherein the wavelength selective reflecting layer comprises a multilayer optical film.

Item 27. The system of any one of items 1 to 26, wherein the wavelength selective reflecting layer comprises an interference filter.

Item 28. The system of any one of items 1 to 27, wherein the optical filter is disposed on a substrate layer.

Item 29. The system of any one of items 1 to 28, further comprising a retroreflective layer adjacent the wavelength selective reflecting layer.

Item 30. The system of item 29, wherein the wavelength selective reflecting layer is disposed between the retroreflective layer and the wavelength selective scattering layer.

Item 31. The system of any one of items 1 to 30, further comprising a low-index layer adjacent the wavelength selective reflecting layer.

Item 32. The system of item 31, wherein the wavelength selective reflecting layer is disposed between the low-index layer and the wavelength selective scattering layer.

Item 33. The system of any one of items 1 to 32, further comprising a wavelength selective absorbing layer, wherein the wavelength selective absorbing layer transmits visible wavelengths.

Item 34. The system of item 33, wherein the wavelength selective absorbing layer comprises at least one of a wavelength selective dye, a wavelength selective pigment, a spectral downconverter, or a fluorescent species.

Item 35. The system of items 33 or 34, wherein the wavelength selective reflecting layer is disposed between the wavelength selective absorbing layer and the wavelength selective scattering layer.

Item 36. The system of item 33 or 34, wherein the wavelength selective absorbing layer is disposed between the wavelength selective reflective layer and the wavelength selective scattering layer.

Item 37. The system of any one of items 1 to 36, wherein the optical filter comprises surface optical microstructures.

Item 38. The system of any one of items 1 to 37, wherein the optical filter comprises a beaded diffuser layer.

Item 39. The system of any one of items 1 to 38, wherein the optical filter comprises a sealant layer.

Item 40. The system of any one of items 1 to 39, wherein the optical filter comprises a protective coating.

Item 41. The system of any one of items 1 to 40, wherein the optical filter has a visible transmittance at 380-800 nm of less than 5% and a near-infrared transmittance at 830-900 nm of greater than 5% for wavelengths greater than 830 nm.

Item 42. The system of item 41, wherein the visible transmittance at 380-800 nm is less than 0.1% and the near-infrared transmittance at 830-900 nm is greater than 50%.

Item 43. The system of any one of items 1 to 42, wherein the light emitter comprises a near-infrared LED or a near-infrared laser.

Item 44. The system of any one of items 1 to 43, wherein the light receiver comprises a near-infrared camera or a light sensor having a near-infrared receiving band.

Item 45. The system of any one of items 1 to 44, wherein the optical filter is configured to at least partially shield the light receiver from visible wavelengths while substantially allowing the light receiver to receive near-infrared wavelengths.

Item 46. The system of any one of items 1 to 45, wherein the optical filter is configured to camouflage one or both of the light receiver or the light emitter from a visual perception.

Item 47. The system of item 46, wherein the optical filter is configured to at least partially camouflage one or both of the light receiver or the light emitter from a visual perception by scattering visible wavelengths.

Item 48. An article comprising an optical filter, wherein the optical filter comprises:
a wavelength selective scattering layer, wherein the wavelength selective scattering layer is configured to scatter visible light; and
a wavelength selective reflecting layer, wherein the wavelength selective reflecting layer has a predetermined transmission band configured to compensate for a color deviation in light received by the optical filter.

Item 49. The article of item 48, wherein the wavelength selective scattering layer is configured to transmit near-infrared light.

Item 50. The article of items 48 or 49, wherein the predetermined transmission band is configured to compensate for the color deviation by shifting a scattered color towards a predetermined reference color.

Item 51. The article of item 50, wherein the reference color is associated with predetermined L, a, and b color values.

Item 52. The article of item 50, wherein the reference color is a white color.

Item 53. The article of any one of items 48 to 52, wherein the transmission band includes a narrow band centered at a wavelength between about 400 and about 600 nm.

Item 54. The article of any one of items 48 to 53, wherein the wavelength selective reflecting layer has a transmittance below a predetermined threshold between a lower transmission band edge and an upper transmission band edge of the predetermined transmission band, and wherein the wavelength selective reflecting layer has a transmittance above the predetermined threshold beyond the lower and upper transmission band edges.

Item 55. The article of item 54, wherein the wavelength selective reflecting layer substantially transmits no light between the lower transmission band edge and the upper transmission band edge.

Item 56. The article of items 53 or 54, wherein the lower transmission band edge is at less than or about 400 nm and the upper transmission band edge is at greater than or about 800 nm.

Item 57. The article of any one of items 48 to 56, wherein the wavelength selective scattering layer has a near-infrared scattering ratio of less than about 0.9, the near-infrared scattering ratio being a ratio of an average near-infrared scattering to an average visible scattering, and wherein the wavelength selective scattering layer has a visible reflective haze ratio of greater than about 0.5, the visible reflective haze ratio being a ratio of an average visible diffusive reflectance to an average visible total reflectance.

Item 58. The article of item 57, wherein the wavelength selective scattering layer has a near-infrared scattering ratio of less than about 0.7.

Item 59. The article of item 57, wherein the wavelength selective scattering layer has a near-infrared scattering ratio of less than about 0.6.

Item 60. The article of any one of items 57 to 59, wherein the wavelength selective scattering layer has a visible reflective haze ratio of greater than about 0.6.

Item 61. The article of item 60, wherein the wavelength selective scattering layer has a visible reflective haze ratio of greater than about 0.7.

Item 62. The article of any one of items 48 to 61, wherein the wavelength selective scattering layer transmits less than about 50% of incident visible light, and wherein the wavelength selective scattering layer transmits greater than about 50% of incident near-infrared light.

Item 63. The article of any one of items 48 to 62, wherein the wavelength selective scattering layer scatters greater than about 50% of incident visible light.

Item 64. The article of item 63, wherein the wavelength selective scattering layer scatters greater than about 50% of incident visible light as white light.

Item 65. The article of any one of items 48 to 64, wherein the wavelength selective scattering layer comprises an optical medium have a first refractive index, wherein the optical medium comprises a plurality of particles, wherein the plurality of particles has a second refractive index and an average particle size of less than about 5 μm, and wherein an absolute difference between the first refractive index and the second refractive index is less than about 0.1.

Item 66. The article of any one of items 48 to 65, wherein the wavelength selective scattering layer comprises an optical medium having a first refractive index, wherein the optical medium comprises a plurality of particles, wherein the plurality of particles has a second refractive index and an average particle size of less than about 1 μm, and wherein an absolute difference between the first refractive index and the second refractive index is less than about 0.2.

Item 67. The article of any one of items 48 to 65, wherein the wavelength selective scattering layer comprises an optical medium having a first refractive index, wherein the optical medium comprises a plurality of particles, wherein the plurality of particles has a second refractive index and an average particle size of less than about 0.5 μm, and wherein an absolute difference between the first refractive index and the second refractive index is less than about 0.4.

Item 68. The article of any one of items 48 to 65, wherein the wavelength selective scattering layer comprises an optical medium having a first refractive index, wherein the optical medium comprises a plurality of particles, wherein the plurality of particles has a second refractive index and an average particle size of less than about 0.3 μm, and wherein an absolute difference between the first refractive index and the second refractive index is less than about 0.6.

Item 69. The article of any one of items 48 to 65, wherein the wavelength selective scattering layer comprises an optical medium having a first refractive index, wherein the optical medium comprises a plurality of particles, wherein the plurality of particles has a second refractive index and an average particle size of less than about 0.2 μm, and wherein an absolute difference between the first refractive index and the second refractive index is less than about 1.8.

Item 70. The article of any one of items 48 to 65, wherein the wavelength selective scattering layer comprises a binder, a plurality of particles, and a plurality of interconnected voids, wherein a volume fraction of the plurality of interconnected voids in the wavelength selective scattering layer is not less than about 20%, and wherein a weight ratio of the binder to the plurality of the particles is not less than about 1:2.

Item 71. The article of any one of items 48 to 70, wherein the wavelength selective scattering layer has a visible haze of at least 25%.

Item 72. The article of any one of items 48 to 71, wherein the wavelength selective reflecting layer comprises a multilayer optical film.

Item 73. The article of any one of items 48 to 72, wherein the wavelength selective reflecting layer comprises an interference filter.

Item 74. The article of any one of items 48 to 73, wherein the optical filter is disposed on a substrate layer.

Item 75. The article of any one of items 48 to 74, further comprising a retroreflective layer adjacent the wavelength selective reflecting layer.

Item 76. The article of item 75, wherein the wavelength selective reflecting layer is disposed between the retroreflective layer and the wavelength selective scattering layer.

Item 77. The article of any one of items 48 to 76, further comprising a low-index layer adjacent the wavelength selective reflecting layer.

Item 78. The article of item 77, wherein the wavelength selective reflecting layer is disposed between the low-index layer and the wavelength selective scattering layer.

Item 79. The article of any one of items 48 to 78, further comprising a wavelength selective absorbing layer, wherein the wavelength selective absorbing layer transmits visible wavelengths.

Item 80. The article of item 79, wherein the wavelength selective absorbing layer comprises at least one of a wavelength selective dye, a wavelength selective pigment, a spectral downconverter, or a fluorescent species.

Item 81. The article of items 79 or 80, wherein the wavelength selective reflecting layer is disposed between the wavelength selective absorbing layer and the wavelength selective scattering layer.

Item 82. The article of item 79 or 80, wherein the wavelength selective absorbing layer is disposed between the wavelength selective reflective layer and the wavelength selective scattering layer.

Item 83. The article of any one of items 48 to 82, wherein the optical filter comprises surface optical microstructures.

Item 84. The article of any one of items 48 to 83, wherein the optical filter comprises a beaded diffuser layer.

Item 85. The article of any one of items 48 to 84, wherein the optical filter comprises a sealant layer.

Item 86. The article of any one of items 48 to 85, wherein the optical filter comprises a protective coating.

Item 87. The article of any one of items 48 to 86, wherein the optical filter has a visible transmittance at 380-800 nm of less than 5% and a near-infrared transmittance at 830-900 nm of greater than 5% for wavelengths greater than 830 nm.

Item 88. The article of item 87, wherein the visible transmittance at 380-800 nm is less than 0.1% and the near-infrared transmittance at 830-900 nm is greater than 50%.

Item 89. A system comprising:
one or both of a light emitter or a light receiver; and
an optical filter adjacent one or both of the light emitter or the light receiver, wherein the optical filter comprises:
a wavelength selective scattering layer, wherein the wavelength selective scattering layer is configured to scatter visible light; and
a broadband reflecting layer, wherein the broadband reflecting layer has a predetermined reflection band configured to compensate for a color deviation in light emitted by the light emitter or received by the light receiver.

Item 90. The system of item 89, wherein the predetermined reflection band is configured to compensate for the color deviation by shifting a scattered color towards a predetermined reference color.

Item 91. The system of item 90, wherein the reference color is associated with predetermined L, a, and b color values.

Item 92. The system of item 90, wherein the reference color is a white color.

Item 93. The system of any one of items 89 to 92, wherein the predetermined reflection band includes a lower band edge that is a first visible wavelength and an upper band edge that is a second visible wavelength.

Item 94. The system of item 93, wherein one or both of the first and the second visible wavelengths are between about 400 nm and about 800 nm.

Item 95. The system of any one of items 89 to 94, wherein the wavelength selective scattering layer is configured to transmit near-infrared light.

Item 96. The system of any one of items 89 to 95, further including a wavelength selective reflecting layer configured to substantially transmit infrared wavelengths.

Item 97. The system of any one of items 89 to 96, wherein the wavelength selective reflecting layer has a transmittance below a predetermined threshold between a lower transmission band edge and an upper transmission band edge of a predetermined transmission band, and wherein the wavelength selective reflecting layer has a transmittance above the predetermined threshold beyond the lower and upper transmission band edges.

Item 98. The system of item 97, wherein the wavelength selective reflecting layer substantially transmits no light between the lower transmission band edge and the upper transmission band edge.

Item 99. The system of any one of items 89 to 98, wherein the wavelength selective scattering layer has a near-infrared scattering ratio of less than about 0.9, the near-infrared scattering ratio being a ratio of an average near-infrared scattering to an average visible scattering, and wherein the wavelength selective scattering layer has a visible reflective haze ratio of greater than about 0.5, the visible reflective haze ratio being a ratio of an average visible diffusive reflectance to an average visible total reflectance.

Item 100. The system of item 99, wherein the wavelength selective scattering layer has a near-infrared scattering ratio of less than about 0.7.

Item 101. The system of item 99, wherein the wavelength selective scattering layer has a near-infrared scattering ratio of less than about 0.6.

Item 102. The system of any one of items 99 to 101, wherein the wavelength selective scattering layer has a visible reflective haze ratio of greater than about 0.6.

Item 103. The system of item 102, wherein the wavelength selective scattering layer has a visible reflective haze ratio of greater than about 0.7.

Item 104. The system of any one of items 89 to 103, wherein one or both of the light emitter or the light receiver have an operating wavelength within a near-infrared range.

Item 105. The system of any one of items 89 to 104, wherein the wavelength selective scattering layer transmits less than about 50% of incident visible light, and wherein the wavelength selective scattering layer transmits greater than about 50% of incident near-infrared light.

Item 106. The system of any one of items 89 to 105, wherein the wavelength selective scattering layer scatters greater than about 50% of incident visible light.

Item 107. The system of item 106, wherein the wavelength selective scattering layer scatters greater than about 50% of incident visible light as white light.

Item 108. The system of any one of items 89 to 107, wherein the wavelength selective scattering layer comprises an optical medium have a first refractive index, wherein the optical medium comprises a plurality of particles, wherein the plurality of particles has a second refractive index and an average particle size of less than about 5 µm, and wherein an absolute difference between the first refractive index and the second refractive index is less than about 0.1.

Item 109. The system of any one of items 89 to 108, wherein the wavelength selective scattering layer comprises an optical medium having a first refractive index, wherein the optical medium comprises a plurality of particles, wherein the plurality of particles has a second refractive index and an average particle size of less than about 1 µm, and wherein an absolute difference between the first refractive index and the second refractive index is less than about 0.2.

Item 110. The system of any one of items 89 to 109, wherein the wavelength selective scattering layer comprises an optical medium having a first refractive index, wherein the optical medium comprises a plurality of particles, wherein the plurality of particles has a second refractive index and an average particle size of less than about 0.5 µm, and wherein an absolute difference between the first refractive index and the second refractive index is less than about 0.4.

Item 111. The system of any one of items 89 to 109, wherein the wavelength selective scattering layer comprises an optical medium having a first refractive index, wherein the optical medium comprises a plurality of particles, wherein the plurality of particles has a second refractive index and an average particle size of less than about 0.3 µm, and wherein an absolute difference between the first refractive index and the second refractive index is less than about 0.6.

Item 112. The system of any one of items 89 to 109, wherein the wavelength selective scattering layer comprises an optical medium having a first refractive index, wherein the optical medium comprises a plurality of particles, wherein the plurality of particles has a second refractive index and an average particle size of less than about 0.2 µm, and wherein an absolute difference between the first refractive index and the second refractive index is less than about 1.8.

Item 113. The system of any one of items 89 to 109, wherein the wavelength selective scattering layer comprises a binder, a plurality of particles, and a plurality of interconnected voids, wherein a volume fraction of the plurality of interconnected voids in the wavelength selective scattering layer is not less than about 20%, and wherein a weight ratio of the binder to the plurality of the particles is not less than about 1:2.

Item 114. The system of any one of items 89 to 113, wherein the wavelength selective scattering layer has a visible haze of at least 25%.

Item 115. The system of any one of items 96 to 114, wherein the wavelength selective reflecting layer comprises a multilayer optical film.

Item 116. The system of any one of items 96 to 114, wherein the wavelength selective reflecting layer comprises an interference filter.

Item 117. The system of any one of items 89 to 116, wherein the optical filter is disposed on a substrate layer.

Item 118. The system of any one of items 89 to 117, wherein the broadband reflecting layer comprises one or more of a specular reflecting layer, a diffusive reflecting layer, or a retroreflective layer.

Item 119. The system of item 118, wherein the wavelength selective reflecting layer is disposed between the broadband reflecting layer and the wavelength selective scattering layer.

Item 120. The system of any one of items 89 to 119, further comprising a low-index layer adjacent the wavelength selective scattering layer.

Item 121. The system of item 120, wherein the low-index layer is disposed between the broadband reflecting layer and the wavelength selective scattering layer.

Item 122. The system of any one of items 89 to 121, further comprising a wavelength selective absorbing layer, wherein the wavelength selective absorbing layer transmits visible wavelengths.

Item 123. The system of item 122, wherein the wavelength selective absorbing layer comprises at least one of a wavelength selective dye, a wavelength selective pigment, a spectral downconverter, or a fluorescent species.

Item 124. The system of items 122 or 123, wherein the wavelength selective absorbing layer is disposed between the broadband reflecting layer and the wavelength selective scattering layer.

Item 125. The system of item 122 or 123, wherein the wavelength selective scattering layer is disposed between the wavelength selective absorbing layer and the broadband reflecting layer.

Item 126. The system of any one of items 89 to 125, wherein the optical filter comprises surface optical microstructures.

Item 127. The system of any one of items 89 to 126, wherein the optical filter comprises a beaded diffuser layer.

Item 128. The system of any one of items 89 to 127, wherein the optical filter comprises a sealant layer.

Item 129. The system of any one of items 89 to 128, wherein the optical filter comprises a protective coating.

Item 130. The system of any one of items 89 to 129, wherein the optical filter has a visible transmittance at 380-800 nm of less than 5% and a near-infrared transmittance at 830-900 nm of greater than 5% for wavelengths greater than 830 nm.

Item 131. The system of item 130, wherein the visible transmittance at 380-800 nm is less than 0.1% and the near-infrared transmittance at 830-900 nm is greater than 50%.

Item 132. The system of any one of items 89 to 131, wherein the light emitter comprises a near-infrared LED or a near-infrared laser.

Item 133. The system of any one of items 89 to 132, wherein the light receiver comprises a near-infrared camera or a light sensor having a near-infrared receiving band.

Item 134. The system of any one of items 89 to 133, wherein the optical filter is configured to at least partially shield the light receiver from visible wavelengths while substantially allowing the light receiver to receive near-infrared wavelengths.

Item 135. The system of any one of items 89 to 134, wherein the optical filter is configured to camouflage one or both of the light receiver or the light emitter from a visual perception.

Item 136. The system of item 135, wherein the optical filter is configured to at least partially camouflage one or both of the light receiver or the light emitter from a visual perception by scattering visible wavelengths.

Item 137. An article comprising an optical filter, wherein the optical filter comprises:
a wavelength selective scattering layer, wherein the wavelength selective scattering layer is configured to scatter visible light; and
a broadband reflecting layer, wherein the broadband reflecting layer has a predetermined reflection band configured to compensate for a color deviation in light received by the optical filter.

Item 138. The article of item 137, wherein the predetermined reflection band is configured to compensate for the color deviation by shifting a scattered color towards a predetermined reference color.

Item 139. The article of item 138, wherein the reference color is associated with predetermined L, a, and b color values.

Item 140. The article of item 138, wherein the reference color is a white color.

Item 141. The article of any one of items 137 to 140, wherein the predetermined reflection band includes a lower band edge that is a first visible wavelength and an upper band edge that is a second visible wavelength.

Item 142. The article of item 141, wherein one or both of the first and the second visible wavelengths are between about 400 nm and about 800 nm.

Item 143. The article of any one of items 137 to 142, wherein the wavelength selective scattering layer is configured to transmit near-infrared light.

Item 144. The article of any one of items 137 to 143, further including a wavelength selective reflecting layer configured to substantially transmit infrared wavelengths.

Item 145. The article of any one of items 137 to 144, wherein the wavelength selective reflecting layer has a transmittance below a predetermined threshold between a lower transmission band edge and an upper transmission band edge of a predetermined transmission band, and wherein the wavelength selective reflecting layer has a transmittance above the predetermined threshold beyond the lower and upper transmission band edges.

Item 146. The article of item 145, wherein the wavelength selective reflecting layer substantially transmits no light between the lower transmission band edge and the upper transmission band edge.

Item 147. The article of any one of items 137 to 146, wherein the wavelength selective scattering layer has a near-infrared scattering ratio of less than about 0.9, the near-infrared scattering ratio being a ratio of an average near-infrared scattering to an average visible scattering, and wherein the wavelength selective scattering layer has a visible reflective haze ratio of greater than about 0.5, the visible reflective haze ratio being a ratio of an average visible diffusive reflectance to an average visible total reflectance.

Item 148. The article of item 147, wherein the wavelength selective scattering layer has a near-infrared scattering ratio of less than about 0.7.

Item 149. The article of item 147, wherein the wavelength selective scattering layer has a near-infrared scattering ratio of less than about 0.6.

Item 150. The article of any one of items 147 to 149, wherein the wavelength selective scattering layer has a visible reflective haze ratio of greater than about 0.6.

Item 151. The article of item 150, wherein the wavelength selective scattering layer has a visible reflective haze ratio of greater than about 0.7.

Item 152. The article of any one of items 137 to 151, wherein the wavelength selective scattering layer transmits less than about 50% of incident visible light, and wherein the wavelength selective scattering layer transmits greater than about 50% of incident near-infrared light.

Item 153. The article of any one of items 137 to 152, wherein the wavelength selective scattering layer scatters greater than about 50% of incident visible light.

Item 154. The article of item 153, wherein the wavelength selective scattering layer scatters greater than about 50% of incident visible light as white light.

Item 155. The article of any one of items 137 to 154, wherein the wavelength selective scattering layer comprises an optical medium have a first refractive index, wherein the optical medium comprises a plurality of particles, wherein the plurality of particles has a second refractive index and an average particle size of less than about 5 μm, and wherein an absolute difference between the first refractive index and the second refractive index is less than about 0.1.

Item 156. The article of any one of items 137 to 154, wherein the wavelength selective scattering layer comprises an optical medium having a first refractive index, wherein the optical medium comprises a plurality of particles, wherein the plurality of particles has a second refractive index and an average particle size of less than about 1 μm, and wherein an absolute difference between the first refractive index and the second refractive index is less than about 0.2.

Item 157. The article of any one of items 137 to 154, wherein the wavelength selective scattering layer comprises an optical medium having a first refractive index, wherein the optical medium comprises a plurality of particles, wherein the plurality of particles has a second refractive index and an average particle size of less than about 0.5 μm, and wherein an absolute difference between the first refractive index and the second refractive index is less than about 0.4.

Item 158. The article of any one of items 137 to 154, wherein the wavelength selective scattering layer comprises an optical medium having a first refractive index, wherein the optical medium comprises a plurality of particles, wherein the plurality of particles has a second refractive index and an average particle size of less than about 0.3 μm, and wherein an absolute difference between the first refractive index and the second refractive index is less than about 0.6.

Item 159. The article of any one of items 137 to 154, wherein the wavelength selective scattering layer comprises an optical medium having a first refractive index, wherein the optical medium comprises a plurality of particles, wherein the plurality of particles has a second refractive index and an average particle size of less than about 0.2 μm, and wherein an absolute difference between the first refractive index and the second refractive index is less than about 1.8.

Item 160. The article of any one of items 137 to 154, wherein the wavelength selective scattering layer comprises a binder, a plurality of particles, and a plurality of interconnected voids, wherein a volume fraction of the plurality of interconnected voids in the wavelength selective scattering layer is not less than about 20%, and wherein a weight ratio of the binder to the plurality of the particles is not less than about 1:2.

Item 161. The article of any one of items 137 to 160, wherein the wavelength selective scattering layer has a visible haze of at least 25%.

Item 162. The article of any one of items 137 to 161, wherein the wavelength selective reflecting layer comprises a multilayer optical film.

Item 163. The article of any one of items 137 to 162, wherein the wavelength selective reflecting layer comprises an interference filter.

Item 164. The article of any one of items 137 to 163, wherein the optical filter is disposed on a substrate layer.

Item 165. The article of any one of items 137 to 164, wherein the broadband reflecting layer comprises one or more of a specular reflecting layer, a diffusive reflecting layer, or a retroreflective layer.

Item 166. The article of item 165, wherein the wavelength selective reflecting layer is disposed between the broadband reflecting layer and the wavelength selective scattering layer.

Item 167. The article of any one of items 137 to 166, further comprising a low-index layer adjacent the wavelength selective scattering layer.

Item 168. The article of item 167, wherein the low-index layer is disposed between the broadband reflecting layer and the wavelength selective scattering layer.

Item 169. The article of any one of items 137 to 168, further comprising a wavelength selective absorbing layer, wherein the wavelength selective absorbing layer transmits visible wavelengths.

Item 170. The article of item 169, wherein the wavelength selective absorbing layer comprises at least one of a wavelength selective dye, a wavelength selective pigment, a spectral downconverter, or a fluorescent species.

Item 171. The article of items 169 or 170, wherein the wavelength selective absorbing layer is disposed between the broadband reflecting layer and the wavelength selective scattering layer.

Item 172. The article of item 169 or 170, wherein the wavelength selective scattering layer is disposed between the wavelength selective absorbing layer and the broadband reflecting layer.

Item 173. The article of any one of items 137 to 172, wherein the optical filter comprises surface optical microstructures.

Item 174. The article of any one of items 137 to 173, wherein the optical filter comprises a beaded diffuser layer.

Item 175. The article of any one of items 137 to 174, wherein the optical filter comprises a sealant layer.

Item 176. The article of any one of items 137 to 175, wherein the optical filter comprises a protective coating.

Item 177. The article of any one of items 137 to 176, wherein the optical filter has a visible transmittance at 380-800 nm of less than 5% and a near-infrared transmittance at 830-900 nm of greater than 5% for wavelengths greater than 830 nm.

Item 178. The article of item 177, wherein the visible transmittance at 380-800 nm is less than 0.1% and the near-infrared transmittance at 830-900 nm is greater than 50%.

Item 179. A system comprising:
one or both of a light emitter or a light receiver; and
an optical filter adjacent one or both of the light emitter or the light receiver, wherein the optical filter comprises:
a wavelength selective scattering layer, wherein the wavelength selective scattering layer is configured to scatter visible light; and
a wavelength selective reflecting layer; and
a low-index layer adjacent the wavelength selective reflecting layer, wherein the low-index layer is configured to reduce a color deviation in light emitted by the light emitter or received by the light receiver.

Item 180. The system of item 179, wherein the wavelength selective scattering layer is configured to transmit near-infrared light.

Item 181. The system of items 179 or 180, wherein the low-index layer is configured to compensate for the color deviation by promoting total internal reflection within the wavelength selective reflecting layer.

Item 182. The system of any one of items 179 to 181, wherein the low-index layer is configured to compensate for the color deviation by reducing light leakage through the wavelength selective reflecting layer.

Item 183. The system of any one of items 179 to 182, wherein the low-index layer has a refractive index less than about 1.4.

Item 184. The system of item 183, wherein the low-index layer has a refractive index less than about 1.3.

Item 185. The system of item 184, wherein the low-index layer has a refractive index less than about 1.2.

Item 186. The system of item 185, wherein the low-index layer has a refractive index of about 1.15.

Item 187. The system of any one of items 179 to 186, wherein the low-index layer comprises one or more of a fumed silica, a fluoropolymer, or a composition comprising a binder, a plurality of particles, and a plurality of interconnected voids, wherein a volume fraction of the plurality of interconnected voids in the wavelength selective scattering layer is not less than about 20%, and wherein a weight ratio of the binder to the plurality of the particles is not less than about 1:2.

Item 188. The system of any one of items 179 to 187, wherein the wavelength selective scattering layer has a near-infrared scattering ratio of less than about 0.9, the near-infrared scattering ratio being a ratio of an average near-infrared scattering to an average visible scattering, and wherein the wavelength selective scattering layer has a visible reflective haze ratio of greater than about 0.5, the visible reflective haze ratio being a ratio of an average visible diffusive reflectance to an average visible total reflectance.

Item 189. The system of any one of items 179 to 188, wherein one or both of the light emitter or the light receiver have an operating wavelength within a near-infrared range.

Item 190. The system of any one of items 179 to 189, wherein the wavelength selective scattering layer transmits less than about 50% of incident visible light, and wherein the wavelength selective scattering layer transmits greater than about 50% of incident near-infrared light.

Item 191. The system of any one of items 179 to 190, wherein the wavelength selective scattering layer comprises a binder, a plurality of particles, and a plurality of interconnected voids, wherein a volume fraction of the plurality of interconnected voids in the wavelength selective scattering layer is not less than about 20%, and wherein a weight ratio of the binder to the plurality of the particles is not less than about 1:2.

Item 192. The system of any one of items 179 to 191, wherein the wavelength selective scattering layer has a visible haze of at least 25%.

Item 193. The system of any one of items 179 to 192, wherein the wavelength selective reflecting layer comprises a multilayer optical film.

Item 194. The system of any one of items 179 to 193, wherein the wavelength selective reflecting layer comprises an interference filter.

Item 195. The system of any one of items 179 to 194, wherein the optical filter is disposed on a substrate layer.

Item 196. The system of any one of items 179 to 195, further comprising a retroreflective layer adjacent the low-index layer.

Item 197. The system of item 196, wherein the wavelength selective reflecting layer is disposed between the retroreflective layer and the wavelength selective scattering layer.

Item 198. The system of any one of items 179 to 196, wherein the wavelength selective reflecting layer is disposed between the low-index layer and the wavelength selective scattering layer.

Item 199. The system of any one of items 179 to 198, further comprising a wavelength selective absorbing layer, wherein the wavelength selective absorbing layer transmits visible wavelengths.

Item 200. The system of item 199, wherein the wavelength selective absorbing layer comprises at least one of a wavelength selective dye, a wavelength selective pigment, a spectral downconverter, or a fluorescent species.

Item 201. The system of items 199 or 200, wherein the wavelength selective reflecting layer is disposed between the wavelength selective absorbing layer and the wavelength selective scattering layer.

Item 202. The system of item 200 or 201, wherein the wavelength selective absorbing layer is disposed between the wavelength selective reflective layer and the wavelength selective scattering layer.

Item 203. The system of any one of items 179 to 202, wherein the optical filter comprises surface optical microstructures.

Item 204. The system of any one of items 179 to 203, wherein the optical filter comprises a beaded diffuser layer.

Item 205. The system of any one of items 179 to 204, wherein the optical filter comprises a sealant layer.

Item 206. The system of any one of items 179 to 205, wherein the optical filter comprises a protective coating.

Item 207. The system of any one of items 179 to 206, wherein the optical filter has a visible transmittance at 380-800 nm of less than 5% and a near-infrared transmittance at 830-900 nm of greater than 5% for wavelengths greater than 830 nm.

Item 208. The system of item 207, wherein the visible transmittance at 380-800 nm is less than 0.1% and the near-infrared transmittance at 830-900 nm is greater than 50%.

Item 209. The system of any one of items 179 to 208, wherein the light emitter comprises a near-infrared LED or a near-infrared laser.

Item 210. The system of any one of items 179 to 209, wherein the light receiver comprises a near-infrared camera or a light sensor having a near-infrared receiving band.

Item 211. The system of any one of items 179 to 210, wherein the optical filter is configured to at least partially shield the light receiver from visible wavelengths while substantially allowing the light receiver to receive near-infrared wavelengths.

Item 212. The system of any one of items 179 to 211, wherein the optical filter is configured to camouflage one or both of the light receiver or the light emitter from a visual perception.

Item 213. The system of item 212, wherein the optical filter is configured to at least partially camouflage one or both of the light receiver or the light emitter from a visual perception by scattering visible wavelengths.

Item 214. An article comprising an optical filter, wherein the optical filter comprises:
a wavelength selective scattering layer, wherein the wavelength selective scattering layer is configured to scatter visible light; and
a wavelength selective reflecting layer; and
a low-index layer adjacent the wavelength selective reflecting layer, wherein the low-index layer is configured to reduce a color deviation in light received by the optical filter.

Item 215. The article of item 214, wherein the wavelength selective scattering layer is configured to transmit near-infrared light.

Item 216. The article of items 214 or 215, wherein the low-index layer is configured to compensate for the color deviation by promoting total internal reflection within the wavelength selective scattering layer.

Item 217. The article of any one of items 214 to 216, wherein the low-index layer is configured to compensate for the color deviation by reducing light leakage through the wavelength selective reflecting layer.

Item 218. The article of any one of items 214 to 217, wherein the low-index layer has a refractive index less than about 1.4.

Item 219. The article of item 218, wherein the low-index layer has a refractive index less than about 1.3.

Item 220. The article of item 219, wherein the low-index layer has a refractive index less than about 1.2.

Item 221. The article of item 220, wherein the low-index layer has a refractive index of about 1.15.

Item 222. The article of any one of items 214 to 221, wherein the low-index layer comprises one or more of a fumed silica, a fluoropolymer, or a composition comprising a binder, a plurality of particles, and a plurality of interconnected voids, wherein a volume fraction of the plurality of interconnected voids in the wavelength selective scattering layer is not less than about 20%, and wherein a weight ratio of the binder to the plurality of the particles is not less than about 1:2.

Item 223. The article of any one of items 214 to 222, wherein the wavelength selective scattering layer has a near-infrared scattering ratio of less than about 0.9, the near-infrared scattering ratio being a ratio of an average near-infrared scattering to an average visible scattering, and wherein the wavelength selective scattering layer has a visible reflective haze ratio of greater than about 0.5, the visible reflective haze ratio being a ratio of an average visible diffusive reflectance to an average visible total reflectance.

Item 224. The article of any one of items 214 to 223, wherein the wavelength selective scattering layer transmits less than about 50% of incident visible light, and wherein the wavelength selective scattering layer transmits greater than about 50% of incident near-infrared light.

Item 225. The article of any one of items 214 to 224, wherein the wavelength selective scattering layer comprises a binder, a plurality of particles, and a plurality of interconnected voids, wherein a volume fraction of the plurality of interconnected voids in the wavelength selective scattering layer is not less than about 20%, and wherein a weight ratio of the binder to the plurality of the particles is not less than about 1:2.

Item 226. The article of any one of items 214 to 225, wherein the wavelength selective scattering layer has a visible haze of at least 25%.

Item 227. The article of any one of items 214 to 226, wherein the wavelength selective reflecting layer comprises a multilayer optical film.

Item 228. The article of any one of items 214 to 227, wherein the wavelength selective reflecting layer comprises an interference filter.

Item 229. The article of any one of items 214 to 228, wherein the optical filter is disposed on a substrate layer.

Item 230. The article of any one of items 214 to 229, further comprising a retroreflective layer adjacent the low-index layer.

Item 231. The article of item 230, wherein the wavelength selective reflecting layer is disposed between the retroreflective layer and the wavelength selective scattering layer.

Item 232. The article of any one of items 214 to 231, wherein the wavelength selective reflecting layer is disposed between the low-index layer and the wavelength selective scattering layer.

Item 233. The article of any one of items 214 to 232, further comprising a wavelength selective absorbing layer, wherein the wavelength selective absorbing layer transmits visible wavelengths.

Item 234. The article of item 233, wherein the wavelength selective absorbing layer comprises at least one of a wavelength selective dye, a wavelength selective pigment, a spectral downconverter, or a fluorescent species.

Item 235. The article of items 233 or 234, wherein the wavelength selective reflecting layer is disposed between the wavelength selective absorbing layer and the wavelength selective scattering layer.

Item 236. The article of item 233 or 234, wherein the wavelength selective absorbing layer is disposed between the wavelength selective reflective layer and the wavelength selective scattering layer.

Item 237. The article of any one of items 214 to 236, wherein the optical filter comprises surface optical microstructures.

Item 238. The article of any one of items 214 to 237, wherein the optical filter comprises a beaded diffuser layer.

Item 239. The article of any one of items 214 to 238, wherein the optical filter comprises a sealant layer.

Item 240. The article of any one of items 214 to 239, wherein the optical filter comprises a protective coating.

Item 241. The article of any one of items 214 to 240, wherein the optical filter has a visible transmittance at 380-800 nm of less than 5% and a near-infrared transmittance at 830-900 nm of greater than 5% for wavelengths greater than 830 nm.

Item 242. The article of item 241, wherein the visible transmittance at 380-800 nm is less than 0.1% and the near-infrared transmittance at 830-900 nm is greater than 50%.

Item 243. A system comprising:
one or both of a light emitter or a light receiver; and
an optical filter adjacent one or both of the light emitter or the light receiver, wherein the optical filter comprises:
a wavelength selective scattering layer, wherein the wavelength selective scattering layer is configured to scatter visible light, and wherein the wavelength selective scattering layer comprises nanoparticles dispersed in a binder, wherein the ratio of the nanoparticles to the binder by weight is at least 50%.

Item 244. The system of item 243, wherein the thickness of the wavelength selective scattering layer is at least 0.25 microns.

Item 245. The system of item 244, wherein the thickness of the wavelength selective scattering layer is at least 0.35 microns.

Item 246. The system of item 245, wherein the thickness of the wavelength selective scattering layer is at least 0.5 microns.

Item 247. The system of any one of items 243 to 246, wherein the wavelength selective scattering layer has a narrowband near-infrared scattering ratio of less than about 0.6, the narrowband near-infrared scattering ratio being a ratio of near-infrared scattering at 940 nm to an average visible scattering at wavelengths between 400 nm and 700 nm.

Item 248. The system of item 247, wherein the wavelength selective scattering layer has a narrowband near-infrared scattering ratio of less than about 0.4.

Item 249. The system of item 248, wherein the wavelength selective scattering layer has a near-infrared scattering ratio of less than about 0.3.

Item 250. The system of any one of items 243 to 249, wherein the wavelength selective scattering layer has a diffuse reflected color L value of greater than 90.

Item 251. The system of any one of items 243 to 249, wherein the wavelength selective scattering layer is configured to transmit near-infrared light.

Item 252. The system of any one of items 243 to 251, further comprising a wavelength selective reflecting layer adjacent the wavelength selective scattering layer.

Item 253. The system of item 252, wherein the wavelength selective reflecting layer comprises a multilayer optical film.

Item 254. The system of items 252, wherein the wavelength selective reflecting layer comprises an interference filter.

Item 255. The system of any one of items 243 to 254, wherein one or both of the light emitter or the light receiver have an operating wavelength within a near-infrared range.

Item 256. The system of any one of items 243 to 255, wherein the wavelength selective scattering layer transmits less than about 50% of incident visible light, and wherein the wavelength selective scattering layer transmits greater than about 50% of incident near-infrared light.

Item 257. The system of any one of items 243 to 256, wherein the wavelength selective scattering layer scatters greater than about 50% of incident visible light.

Item 258. The system of item 257, wherein the wavelength selective scattering layer scatters greater than about 50% of incident visible light as white light.

Item 259. The system of any one of items 243 to 258, wherein the optical filter is disposed on a substrate layer.

Item 260. The system of any one of items 243 to 259, further comprising a low-index layer adjacent the wavelength selective reflecting layer.

Item 261. The system of item 260, wherein the wavelength selective reflecting layer is disposed between the low-index layer and the wavelength selective scattering layer.

Item 262. The system of any one of items 243 to 261, further comprising a wavelength selective absorbing layer, wherein the wavelength selective absorbing layer transmits visible wavelengths.

Item 263. The system of item 262, wherein the wavelength selective absorbing layer comprises at least one of a wavelength selective dye, a wavelength selective pigment, a spectral downconverter, or a fluorescent species.

Item 264. The system of items 262 or 263, wherein the wavelength selective reflecting layer is disposed between the wavelength selective absorbing layer and the wavelength selective scattering layer.

Item 265. The system of item 262 or 263, wherein the wavelength selective absorbing layer is disposed between the wavelength selective reflective layer and the wavelength selective scattering layer.

Item 266. The system of any one of items 243 to 265, wherein the optical filter comprises surface optical microstructures.

Item 267. The system of any one of items 243 to 266, wherein the optical filter comprises a beaded diffuser layer.

Item 268. The system of any one of items 243 to 267, wherein the optical filter comprises a sealant layer.

Item 269. The system of any one of items 243 to 268, wherein the optical filter comprises a protective coating.

Item 270. The system of any one of items 243 to 269, wherein the optical filter has a visible transmittance at 380-800 nm of less than 5% and a near-infrared transmittance at 830-900 nm of greater than 5% for wavelengths greater than 830 nm.

Item 271. The system of item 270, wherein the visible transmittance at 380-800 nm is less than 0.1% and the near-infrared transmittance at 830-900 nm is greater than 50%.

Item 272. The system of any one of items 243 to 271, wherein the light emitter comprises a near-infrared LED or a near-infrared laser.

Item 273. The system of any one of items 243 to 272, wherein the light receiver comprises a near-infrared camera or a light sensor having a near-infrared receiving band.

Item 274. The system of any one of items 243 to 273, wherein the optical filter is configured to at least partially shield the light receiver from visible wavelengths while substantially allowing the light receiver to receive near-infrared wavelengths.

Item 275. The system of any one of items 243 to 274, wherein the optical filter is configured to camouflage one or both of the light receiver or the light emitter from a visual perception.

Item 276. The system of item 275, wherein the optical filter is configured to at least partially camouflage one or both of the light receiver or the light emitter from a visual perception by scattering visible wavelengths.

Item 277. An article comprising an optical filter, wherein the optical filter comprises: a wavelength selective scattering layer, wherein the wavelength selective scattering layer is configured to scatter visible light, and wherein the wavelength selective scattering layer comprises nanoparticles dispersed in a binder, wherein the ratio of the nanoparticles to the binder by weight is at least 50%.

Item 278. The article of item 277, wherein the thickness of the wavelength scattering layer is at least 0.25 microns.

Item 279. The article of item 278, wherein the thickness of the wavelength selective scattering layer is at least 0.35 microns.

Item 280. The article of item 279, wherein the thickness of the wavelength selective scattering layer is at least 0.5 microns.

Item 281. The article of any one of items 277 to 280, wherein the wavelength selective scattering layer has a narrowband near-infrared scattering ratio of less than about 0.6, the narrowband near-infrared scattering ratio being a ratio of near-infrared scattering at 940 nm to an average visible scattering at wavelengths between 400 nm and 700 nm.

Item 282. The article of item 281, wherein the wavelength selective scattering layer has a narrowband near-infrared scattering ratio of less than about 0.4.

Item 283. The article of item 282, wherein the wavelength selective scattering layer has a near-infrared scattering ratio of less than about 0.3.

Item 284. The article of any one of items 277 to 283, wherein the wavelength selective scattering layer has a diffuse reflected color L value of greater than 90.

Item 285. The article of any one of items 277 to 284, wherein the wavelength selective scattering layer is configured to transmit near-infrared light.

Item 286. The article of any one of items 277 to 285, further comprising a wavelength selective reflecting layer adjacent the wavelength selective scattering layer.

Item 287. The article of item 286, wherein the wavelength selective reflecting layer comprises a multilayer optical film.

Item 288. The article of item 286, wherein the wavelength selective reflecting layer comprises an interference filter.

Item 289. The article of any one of items 277 to 288, wherein the wavelength selective scattering layer transmits less than about 50% of incident visible light, and wherein the wavelength selective scattering layer transmits greater than about 50% of incident near-infrared light.

Item 290. The article of any one of items 277 to 289, wherein the wavelength selective scattering layer scatters greater than about 50% of incident visible light.

Item 291. The article of item 290, wherein the wavelength selective scattering layer scatters greater than about 50% of incident visible light as white light.

Item 292. The article of any one of items 277 to 291, wherein the optical filter is disposed on a substrate layer.

Item 293. The article of any one of items 277 to 292, further comprising a low-index layer adjacent the wavelength selective reflecting layer.

Item 294. The article of item 293, wherein the wavelength selective reflecting layer is disposed between the low-index layer and the wavelength selective scattering layer.

Item 295. The article of any one of items 277 to 294, further comprising a wavelength selective absorbing layer, wherein the wavelength selective absorbing layer transmits visible wavelengths.

Item 296. The article of item 295, wherein the wavelength selective absorbing layer comprises at least one of a wavelength selective dye, a wavelength selective pigment, a spectral downconverter, or a fluorescent species.

Item 297. The article of items 295 or 296, wherein the wavelength selective reflecting layer is disposed between the wavelength selective absorbing layer and the wavelength selective scattering layer.

Item 298. The article of item 295 or 296, wherein the wavelength selective absorbing layer is disposed between the wavelength selective reflective layer and the wavelength selective scattering layer.

Item 299. The article of any one of items 277 to 298, wherein the optical filter comprises surface optical microstructures.

Item 300. The article of any one of items 277 to 299, wherein the optical filter comprises a beaded diffuser layer.

Item 301. The article of any one of items 277 to 300, wherein the optical filter comprises a sealant layer.

Item 302. The article of any one of items 277 to 301, wherein the optical filter comprises a protective coating.

Item 303. The article of any one of items 277 to 302, wherein the optical filter has a visible transmittance at 380-800 nm of less than 5% and a near-infrared transmittance at 830-900 nm of greater than 5% for wavelengths greater than 830 nm.

Item 304. The article of item 303, wherein the visible transmittance at 380-800 nm is less than 0.1% and the near-infrared transmittance at 830-900 nm is greater than 50%.

EXAMPLES

Example 1

Optical properties for various sample optical films were determined. Sample optical films S01 to S34 were prepared as described below. The visible scattering, the near-infrared scattering, total visible reflectance, and diffuse visible reflectance were measured for each of samples S01 to S33, using a spectrometer (Lambda 900, PerkinElmer) with integrating spheres to capture diffuse and specular reflectance. The results are presented in TABLE 1. The presented reflectance values include SPIN (specular included, or total) and SPEX (specular excluded, or diffuse) reflectances. The sensitivity of a proximity sensor covered with the respective sample films was determined, and categorized as one of "Not Working," "Functional," "Good," and "Excellent." The transmittance, haze, and clarity was determined for samples S01 to S34, using a haze meter (Haze-gard Plus, BYK-Gardner). The results are presented in TABLE 2.

Samples S01 to S03 were ULI films, with sample S02 including a high haze high clarity ULI film. Sample S01 was prepared by combining Silquest A-174 75 nm silane particles (Momentive) with pentaerythritol triacrylate monomer (SR444, Sartomer) in a 60% wt ratio, and 2.5% of Irgacure 184 (Ciba Specialty Chemicals Company, High Point N.C.), to arrive at a coating thickness of 10 µm. Sample S04 included a film of $TiO_2$ nanoparticles and silicone microparticles. Sample S04 was prepared by mixing 19.13 g of M1192 (Miwon), 3.38 g of CN9018 (Sartomer), 2.5 g of Tospearl 145 (Momentive), 12.5 g of SR415 (Sartomer), 12.5 g of 42.3 wt % $TiO_2$ (UV-TITAN L-530, Sachtleben) in IBOA, 25 g of methylethylketone, and 0.5 g of photoinitiator TPO-L (BASF), and coating the formulation with a #8 Mayer bar. Sample S05 was a film having a microreplicated surface structure. Sample S6 included 3 µm polystyrene beads coated on ESR2 film (Enhanced Specular Reflector, 3M) for 10 micron dry thickness, with pentaerythritol triacrylate binder (SR444, Sartomer) and isopropyl alcohol solvent. Sample S07 included a non-woven material (a bottom diffuser disassembled from a Sony TV model 40W600B). Sample S08 included a $TiO_2$ coated PET film, SH2FGST Fasara Film (3M). Samples S09 and S10 are bulk diffusers with different haze values. Sample S09 included PATTCLR0 frosted acrylate sheet (ePlastics, San Diego, Calif.). Sample S10 included a diffuser plate from a TCL TV (model 40FD2700). Sample S11 was a bottom diffuser sheet from an iPad (first generation, Apple) backlight. Sample S12 included a film of plastic including dispersed $TiO_2$ (plastic 6"×8" pint size seal top food bag with white write-on block, from Elkay Plastics, Bensenville, Ill.). Sample S13 includes white paper (HAmmermill Copy Plus multipurpose printer paper). Sample S14 includes a film having a microreplicated surface structure (iPhone 6 backlight). Samples S15 to S22 include films of ULI material. Sample S23 includes sample S04 folded over itself. Sample S24 includes sample S03 folded over itself. Sample S25 includes sample S15 folded over itself. Sample S26 includes sample S16 folded over itself. Sample S27 includes sample S17 folded over itself. Sample S28 includes sample S18 folded over itself. Sample S29 includes sample S19 folded over itself. Sample S30 includes sample S20 folded over itself. Sample S31 includes sample S21 folded over itself. Sample S32 includes sample S2 folded over itself. Sample S33 includes sample S22 folded over itself.

TABLE 1

| Sample | Scattering | | | Visible Reflection | | | Sensitivity of proximity sensor covered with sample film |
|---|---|---|---|---|---|---|---|
| | Visible (400 nm-700 nm) scattering | NIR (800 nm-1200 nm) scattering | Ratio | SPIN (total) | SPEX (diffuse) | Ratio | |
| S01 | 86.01 | 32.19 | 0.37 | 55.51 | 51.60 | 0.93 | Good |
| S02 | 60.62 | 7.96 | 0.13 | 40.47 | 39.85 | 0.98 | Excellent |
| S03 | 24.18 | 4.47 | 0.19 | 24.47 | 21.01 | 0.86 | Excellent |
| S04 | 86.21 | 57.50 | 0.67 | 37.82 | 35.71 | 0.94 | Functional |
| S05 | 8.40 | 5.00 | 0.60 | 7.10 | 6.15 | 0.87 | Excellent |
| S06 | 98.29 | 98.43 | 1.00 | 55.35 | 55.42 | 1.00 | Not Working |
| S07 | 99.05 | 98.74 | 1.00 | 43.43 | 43.95 | 1.01 | Not Working |
| S08 | 97.66 | 90.26 | 0.92 | 51.62 | 52.29 | 1.01 | Not Working |
| S09 | 87.62 | 88.55 | 1.01 | 7.48 | 6.82 | 0.91 | Not Working |
| S10 | 99.50 | 99.18 | 1.00 | 19.77 | 19.36 | 0.98 | Not Working |
| S11 | 91.87 | 87.81 | 0.96 | 14.67 | 14.35 | 0.98 | Not Working |
| S12 | 98.94 | 93.61 | 0.95 | 45.41 | 45.87 | 1.01 | Not Working |
| S13 | 99.46 | 99.61 | 1.00 | 76.89 | 77.67 | 1.01 | Not Working |
| S14 | 89.00 | 88.00 | 0.99 | 8.87 | 8.63 | 0.97 | Not Working |
| S15 | 1.99 | 0.70 | 0.35 | 10.68 | 1.64 | 0.15 | Excellent |
| S16 | 2.39 | 0.49 | 0.21 | 9.69 | 0.66 | 0.07 | Excellent |
| S17 | 2.48 | 0.43 | 0.17 | 9.15 | 0.53 | 0.06 | Excellent |
| S18 | 30.19 | 4.54 | 0.15 | 25.47 | 21.87 | 0.86 | Excellent |
| S19 | 16.42 | 3.18 | 0.19 | 14.01 | 7.25 | 0.52 | Excellent |
| S20 | 1.91 | 1.01 | 0.53 | 10.32 | 0.96 | 0.09 | Excellent |

TABLE 1-continued

| | Scattering | | | Visible Reflection | | | Sensitivity of proximity sensor |
|---|---|---|---|---|---|---|---|
| Sample | Visible (400 nm-700 nm) scattering | NIR (800 nm-1200 nm) scattering | Ratio | SPIN (total) | SPEX (diffuse) | Ratio | covered with sample film |
| S21 | 37.35 | 36.43 | 0.98 | 15.20 | 9.52 | 0.63 | Good |
| S22 | 99.70 | 98.87 | 0.99 | 56.51 | 56.43 | 1.00 | Not Working |
| S23 | 97.58 | 83.67 | 0.86 | 54.77 | 49.05 | 0.90 | Not Working |
| S24 | 53.02 | 11.18 | 0.21 | 39.14 | 28.48 | 0.73 | Excellent |
| S25 | 6.62 | 2.42 | 0.37 | 18.64 | 2.83 | 0.15 | Excellent |
| S26 | 4.45 | 1.90 | 0.43 | 17.61 | 1.38 | 0.08 | Excellent |
| S27 | 4.46 | 1.98 | 0.44 | 17.13 | 1.34 | 0.08 | Excellent |
| S28 | 51.82 | 9.79 | 0.19 | 39.49 | 29.00 | 0.73 | Excellent |
| S29 | 31.93 | 7.35 | 0.23 | 24.97 | 12.60 | 0.50 | Excellent |
| S30 | 5.52 | 2.85 | 0.52 | 18.27 | 1.44 | 0.08 | Excellent |
| S31 | 65.01 | 61.48 | 0.95 | 27.83 | 16.51 | 0.59 | Functional |
| S32 | 81.04 | 17.08 | 0.21 | 56.29 | 50.05 | 0.89 | Good |
| S33 | 99.68 | 99.53 | 1.00 | 71.10 | 66.58 | 0.94 | Not Working |

TABLE 2

| | BYK Haze Gard Values (Visible) | | |
|---|---|---|---|
| Sample | Transmission | Haze | Clarity |
| S01 | 52.00 | 90.00 | 80.00 |
| S02 | 67.70 | 64.90 | 99.40 |
| S03 | 83.10 | 28.70 | 99.20 |
| S04 | 69.50 | 90.70 | 91.60 |
| S05 | 95.90 | 53.50 | 97.50 |
| S06 | 1.06 | 99.50 | 35.60 |
| S07 | 65.60 | 102.00 | 23.00 |
| S08 | 58.20 | 101.00 | 65.20 |
| S09 | 92.50 | 94.50 | 8.80 |
| S10 | 65.80 | 102.00 | 6.20 |
| S11 | 93.60 | 95.70 | 12.10 |
| S12 | 61.60 | 102.00 | 22.40 |
| S13 | 24.20 | 102.00 | 4.60 |
| S14 | 94.00 | 95.40 | 7.00 |
| S15 | 92.20 | 2.13 | 99.60 |
| S16 | 93.30 | 1.61 | 99.60 |
| S17 | 93.60 | 1.03 | 100.00 |
| S18 | 83.40 | 28.80 | 99.30 |
| S19 | 90.20 | 15.00 | 97.50 |
| S20 | 93.40 | 1.89 | 99.60 |
| S21 | 90.30 | 57.10 | 43.90 |
| S22 | 55.30 | 102.00 | 4.70 |
| S23 | 48.40 | 101.00 | 77.60 |
| S24 | 61.50 | 54.80 | 97.80 |
| S25 | 75.70 | 6.60 | 98.70 |
| S26 | 76.40 | 5.14 | 99.00 |
| S27 | 76.80 | 5.17 | 99.00 |
| S28 | 63.20 | 54.50 | 98.20 |
| S29 | 72.20 | 32.10 | 96.30 |
| S30 | 75.70 | 5.35 | 98.60 |
| S31 | 69.90 | 69.40 | 28.90 |
| S32 | 47.60 | 89.70 | 97.70 |
| S33 | 33.80 | 102.00 | 3.90 |
| S34 | 88.70 | 0.24 | 100.00 |

Example 2

Figure 5:
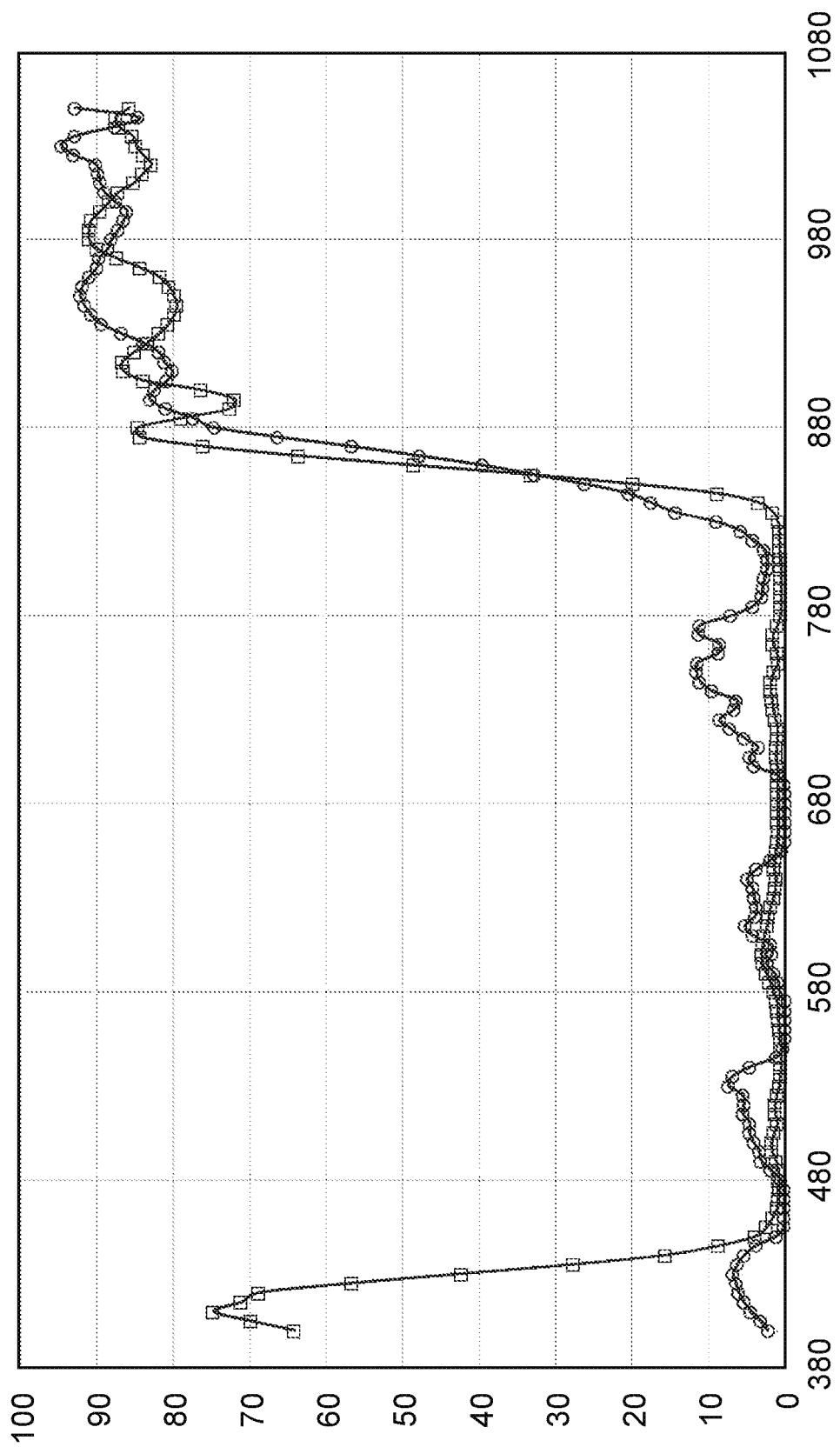
FIG. 5 is a chart illustrating spectra of example optical filters.

The effect of light leakage of wavelength selective reflecting layers of example optical filters including respective wavelength selective reflecting layers adjacent a wavelength scattering layer was on color compensation was evaluated. FIG. 5 is a chart illustrating spectra of example wavelength selective reflecting layers. The spectrum of a wavelength selective reflecting layer with blue light leakage is shown with square markers. The spectrum of a wavelength selective reflecting layer without blue light leakage is shown with circular markers. Each respective wavelength selective reflecting layer was coated with a scattering layer on the front and with black ink on the back. The optical filter including the non-leaking wavelength selective reflecting layer had the following diffusive color values: a*=−4.57; b*=−5.27; and delta (ab)=6.98. The optical filter including the blue light leaking wavelength selective reflecting layer had the following diffusive color values: a*=−4.49; b*=−4.82; and delta (ab)=6.59. Thus, the color had a 6% improvement (compensation) in the case of the optical filter including the blue light leaking wavelength selective reflecting layer.

Example 3

Example scattering layers were prepared using titanium dioxide (TiO2) particles. Sample solutions were made by first dissolving Klucel "L" hydroxypropylcellulose (Hercules, Inc., Wilmington, Del., subsidiary of Ashland, Covington, Ky.) in distilled water (80% of solvents) and then adding isopropyl alcohol (IPA) (Exxon Mobil Chemical Company, Houston, Tex.) (20% of solvents). Ti-Pure R942 0.40 micron particles of titanium dioxide (The Chemours Company, Wilmington, Del.) and/or Polystyrene 1.3 micron beads (PSB) (Soken Chemical and Engineering Co., Ltd., Tokyo, Japan) were then added to the batch followed by BYK 345 surfactant (BYK Inc., Wallingford Conn.). The solution total % solids was maintained at 5%. The surfactant was maintained constant at 0.15% of solids. The solution was then coated onto a substrate and dried at 180° F. for one minute. The ratio of Ti-Pure and PSB to Klucel and the final dried thickness of the coating were adjusted. The samples were measured after lamination to glass with an adhesive between the coated surface and the glass. Planarizing the surface with the adhesive minimized the surface scatter.

The desired scattering ratio measured at 940 nm to the visible at 400-700 nm was less than or equal to 0.25 with a diffuse L color equal to or above 90. The experimental results are given in TABLE 4. The scattering ratio and diffuse color increased with dry thickness.

It is expected that similar results can be achieved by dispersing the $TiO_2$ and/or beads in most binders and solvent systems. It is also expected that any nanometer sized pigment and small beads can be used to achieve a variety of colors.

TABLE 4

| Sample | Ratio of TIO2 to Binder by weight | Ratio of PSB to Binder by weight | Thickness, microns | Diffuse Reflected Color L | Ratio of IR (940 nm) To Visible scattering | Visible (400 nm-700 nm) scattering |
|---|---|---|---|---|---|---|
| SA-01 | 0.54 | 0 | 0.45 | 92.16 | 0.276 | 0.55 |
| SA-02 | 0.54 | 0 | 0.4 | 90.76 | 0.229 | 0.646 |
| SA-03 | 0.54 | 0 | 0.35 | 88.02 | 0.180 | 0.889 |
| SA-04 | 0.54 | 0 | 0.3 | 81.67 | 0.126 | 1.169 |
| SA-05 | 0.67 | 0 | 0.5 | 93.64 | 0.353 | 0.113 |
| SA-06 | 0.67 | 0 | 0.45 | 93.52 | 0.333 | 0.130 |
| SA-07 | 0.67 | 0 | 0.4 | 93.09 | 0.31 | 0.161 |
| SA-08 | 0.67 | 0 | 0.35 | 93.15 | 0.30 | 0.161 |
| SA-09 | 0.67 | 0 | 0.3 | 92.2 | 0.253 | 0.230 |
| SA-10 | 0.67 | 0 | 0.28 | 91.3 | 0.234 | 0.245 |
| SA-11 | 0.67 | 0 | 0.25 | 91.0 | 0.215 | 0.278 |
| SA-12 | 1.038 | 0 | 1.0 | 94.0 | 0.56 | 0.028 |
| SA-13 | 1.038 | 0 | 0.7 | 93.96 | 0.447 | 0.062 |
| SA-14 | 1.038 | 0 | 0.45 | 93.35 | 0.373 | 0.257 |
| SA-15 | 1.038 | 0 | 0.4 | 93.20 | 0.327 | 0.282 |
| SA-16 | 1.038 | 0 | 0.35 | 92.78 | 0.293 | 0.328 |
| SA-17 | 1.038 | 0 | 0.3 | 91.39 | 0.243 | 0.515 |
| SA-18 | 0.68 | 0.17 | 0.46 | 90.2 | 0.219 | 0.301 |
| SA-19 | 0.68 | 0.17 | 0.53 | 91.4 | 0.24 | 0.268 |
| SA-20 | 0.57 | 0.21 | 0.54 | 90.1 | 0.26 | 0.696 |
| SA-21 | 0.57 | 0.21 | 0.45 | 90.1 | 0.23 | 0.584 |
| SA-22 | 0.54 | 0.31 | 0.64 | 89.5 | 0.27 | 0.34 |
| SA-23 | 0.38 | 0.28 | 0.69 | 82.5 | 0.24 | 0.472 |

Example 4

Figure 6:
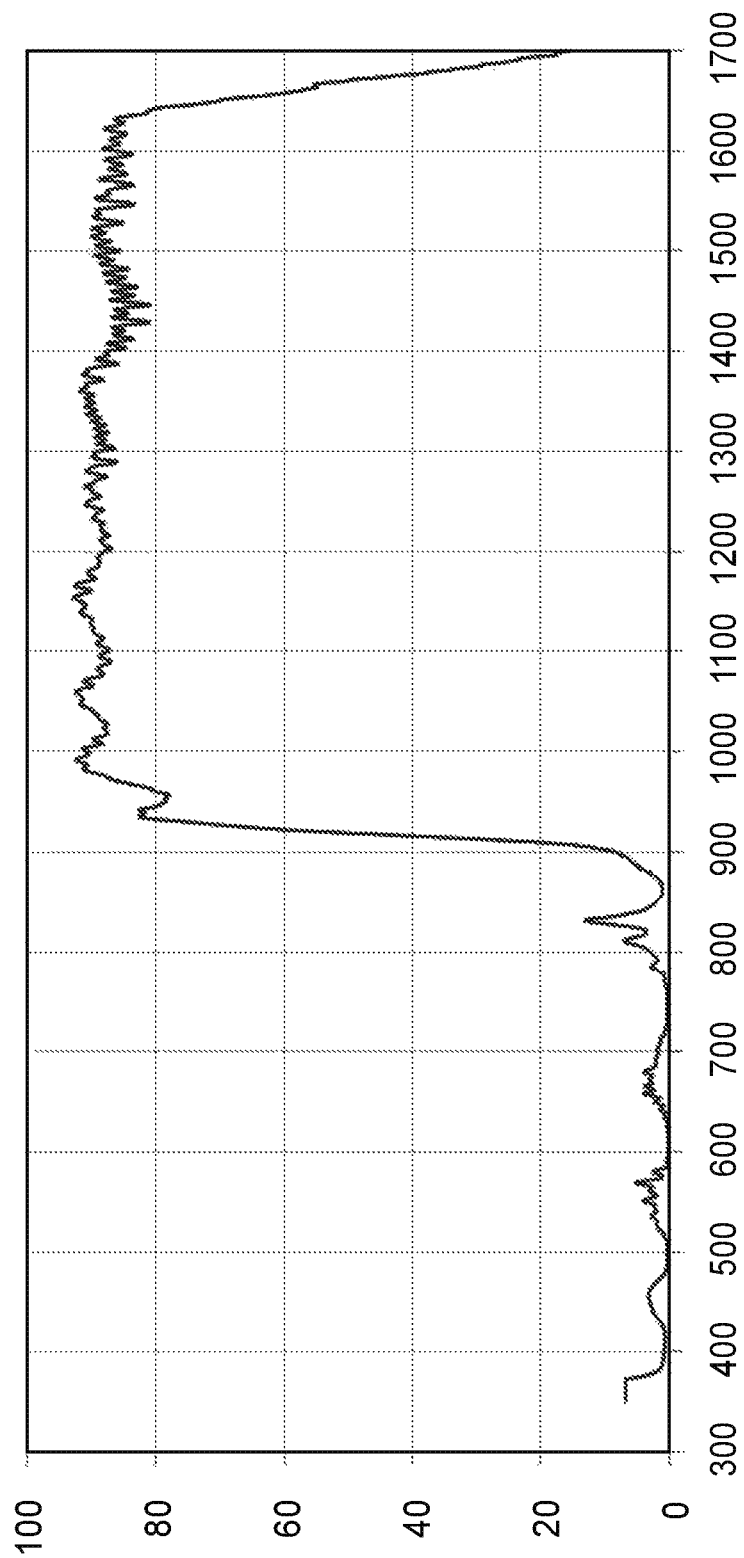
FIG. 6 is a chart presenting a transmission spectrum of an example wavelength selective reflecting layer.

The optical properties of example optical filters including low-index layers were evaluated. FIG. 6 is a chart presenting transmission spectra of an example wavelength selective reflective layer. An example base optical filter included a first wavelength selective scattering layer, and a second wavelength selective reflecting layer having the transmission spectrum shown in FIG. 6. Multiple example filters were prepared by adding different low-index layers including gel ULI films having respective refractive indices (RI) of 1.35, 1.30, 1.25, 1.20, and 1.15. Each respective stack was coated with a black ink coating. Another optical film was prepared without a low-index layer. The optical properties of the example optical filters are presented in TABLE 5.

TABLE 5

| RI of low-index layer | L* | a* | b* |
|---|---|---|---|
| 1.35 | 97.7 | −3.45 | −2.43 |
| 1.30 | 98.1 | −2.87 | −1.92 |
| 1.25 | 98.6 | −2.05 | −1.18 |
| 1.20 | 99.0 | −1.36 | −0.66 |
| 1.15 | 99.2 | −0.54 | −0.38 |
| No low-index (optical coupled) | 97.0 | −3.28 | −2.96 |
| 1.00 (air) | 99.4 | −0.14 | −0.22 |

Multilayer films having an absorbing layer of diffusion layer optically coupled to both surfaces may exhibit an optical leakage of its spectrum, which may result in a perceptible color change (compared to with air, refractive index 1), which may not be desired. As shown in TABLE 5, adding a low-index layer reduces the color change.

Example 5

Figure 7A:
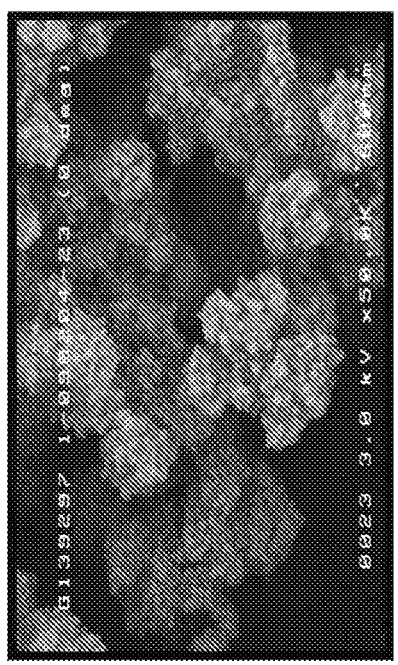
FIGS. 7A and 7B are scanning electron microscopy (SEM) photographs of an example optical filter.
Figure 7B:
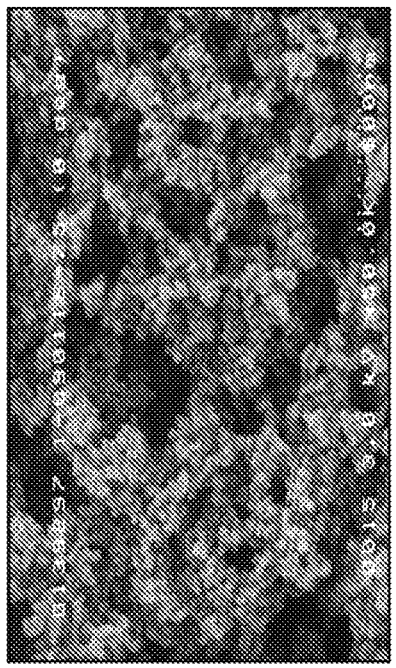

FIGS. 7A and 7B are scanning electron microscopy (SEM) photographs of example optical filters. FIG. 7A shows an optical filter including a high haze low clarity ULI layer (sample S22), while FIG. 7B shows an optical filter including a high haze high clarity ULI layer (sample S02).

Example 6

Figure 8:
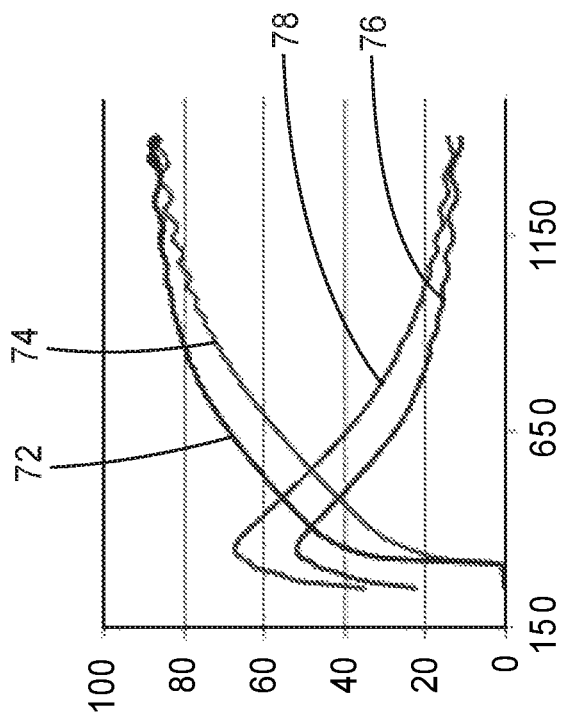
FIG. 8 is a chart presenting reflection and transmission spectra for example optical filters.

FIG. 8 is a chart presenting reflection and transmission spectra for example optical filters. Curve 72 represents % transmission of a first sample ULI layer (sample S01). Curve 74 represents % transmittance of a second sample ULI layer (sample S01, but 50% thicker). Curve 76 represents % transmittance of the first sample ULI layer. Curve 78 represents % reflectance of the second sample ULI layer. As shown in FIG. 8, both sample ULI layers selective reflected visible wavelengths, while transmitting near-infrared wavelengths.

Example 7

Figure 9A:
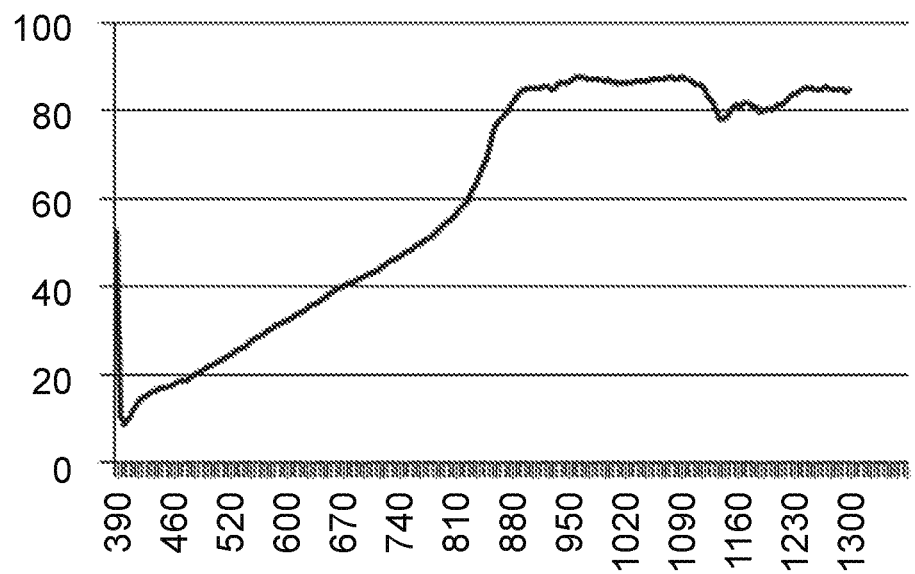
FIGS. 9A and 9B are charts presenting transmission spectra for example optical filters.
Figure 9B:
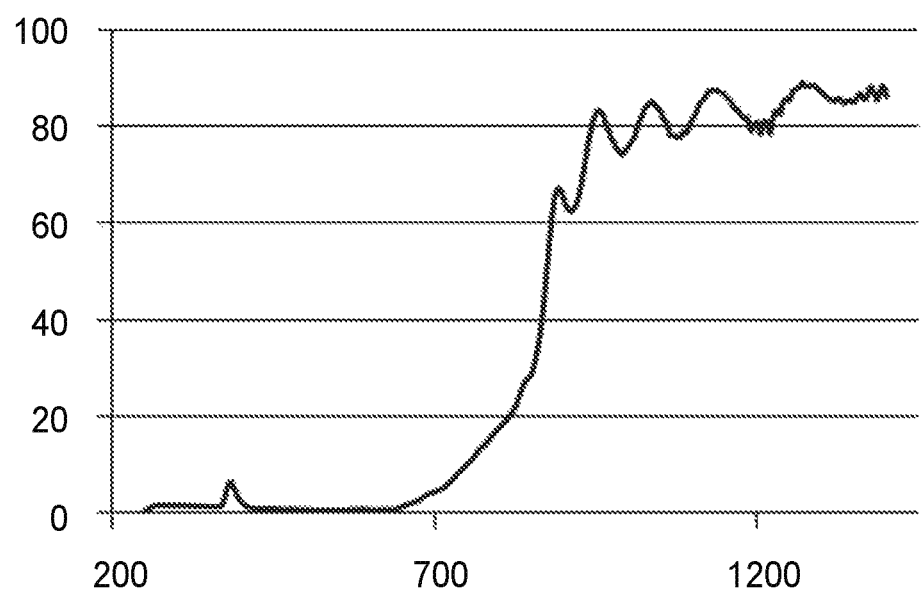

FIGS. 9A and 9B are charts presenting transmission spectra for example optical filters. FIG. 9A presents % transmittance for a first sample optical filter including ESR2 coated with beads (sample S06), and limited with PET. FIG. 9B presents transmittance for a second sample optical filter including ESR2 coated with ULI, and laminated with PET. While both sample optical filters transmitted near-infrared wavelengths, as shown in FIGS. 9A and 9B, the ULI-coated ESR selectively blocked the transmission of visible wavelengths compared to the bead-coated ESR, which blocked visible wavelengths to a lower extent.

Example 8

Figure 10:
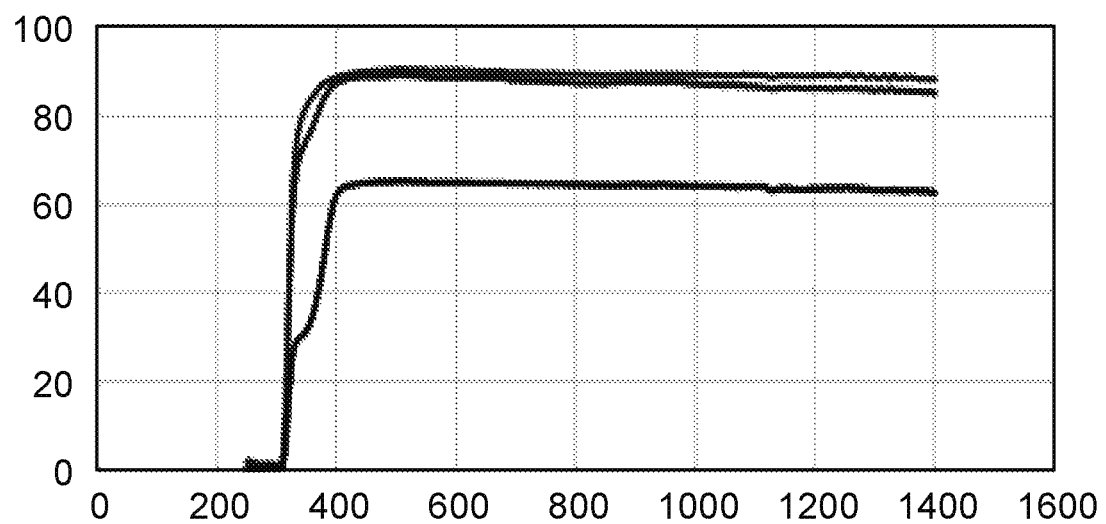
FIG. 10 is a chart presenting transmission spectra for example optical filters.

FIG. 10 is a chart presenting transmission spectra for sample films. The uppermost curve presents % transmittance for uncoated PET, which can be seen to be relatively flat across the visible and near-infrared regions of the spectrum. The middle curve and the lower curve present % transmittance for a #3 Mayer Bar bead-coated PET layer, and a #10 Mayer Bar bead-coated PET layer respectively. While the bead-coat reduced transmittance, it did not selectively reduce transmittance, and the resulting transmittance curve was also relatively flat across the visible and near-infrared regions of the spectrum. Thus, bead-coated PET did not perform well as wavelength selective scattering layers formed by coating ULI.

Example 9

Figure 11:
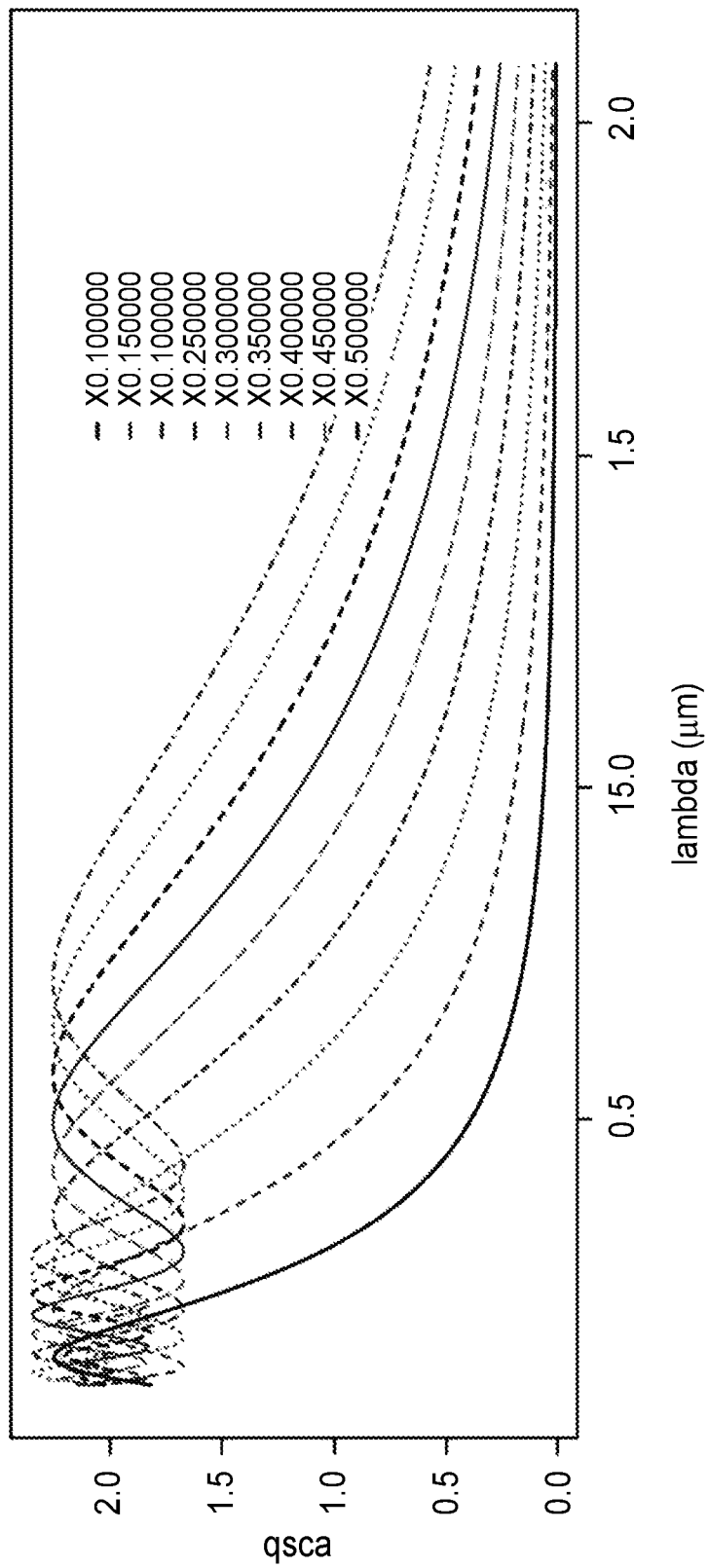
FIG. 11 is a chart presenting results of Mie scattering, showing scattering efficiency versus wavelength for example optical filters.

FIG. 11 is a chart presenting results of Mie scattering, showing scattering efficiency versus wavelength for optical filters including particles of different sizes. For optical filters including particles dispersed in a medium, a model based on Mie scattering was prepared for scattering efficiency as a function of particle size of particles dispersed in the medium and the difference between refractive indices of the medium and the particles. The model was evaluated by setting the refractive index of the medium to 1.5, and that of the scattering particles to 1.0. The particle size was varied from 0.2 µm to 1.0 µm, in steps of 0.1 µm (curves from left to right).

Example 10

Figure 12:
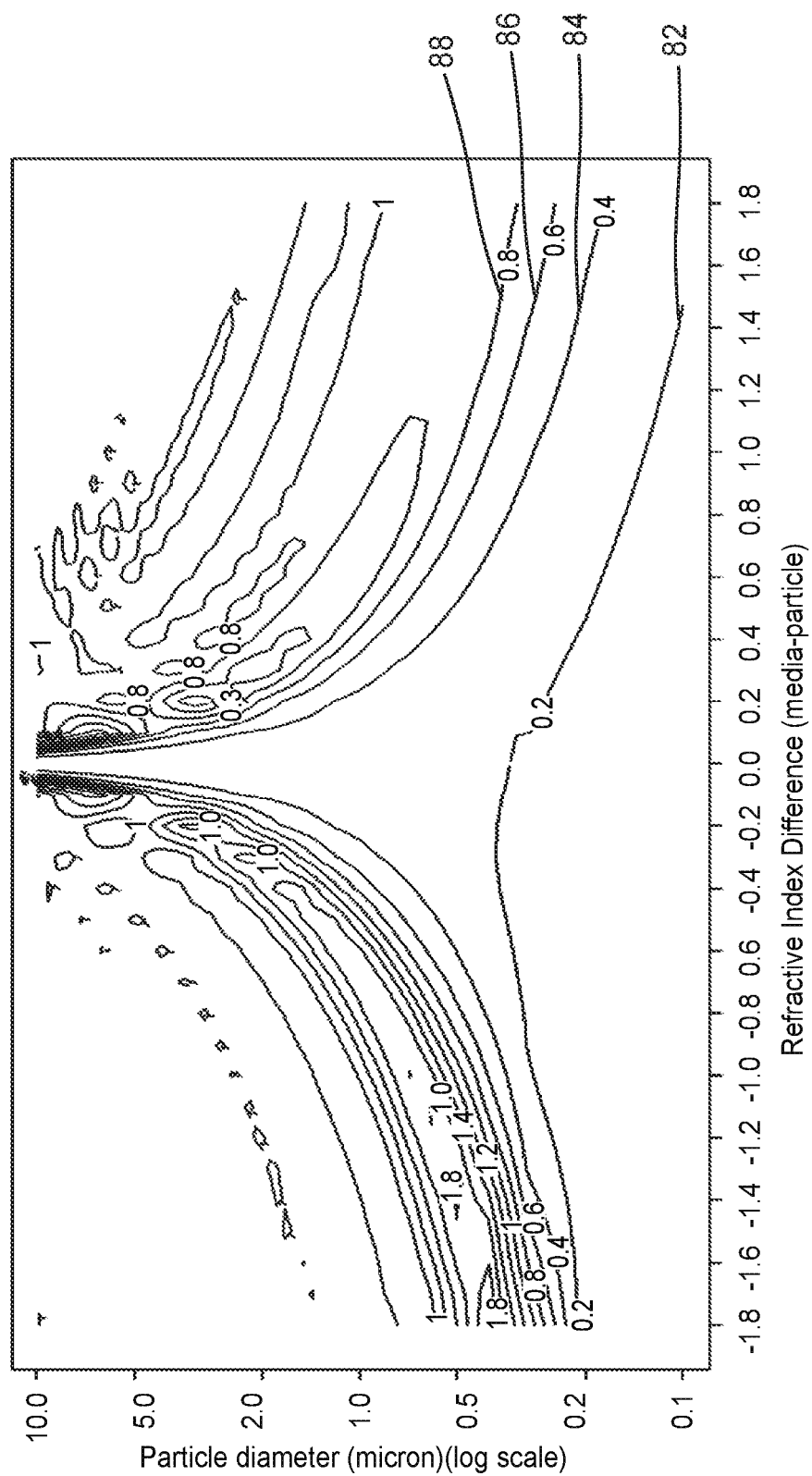
FIG. 12 is a chart presenting near-infrared scattering ratio as a function of particle diameter and refractive index difference for example wavelength selective scattering layers including a medium and a plurality of particles.

FIG. 12 is a chart presenting near-infrared scattering ratio as a function of particle diameter and refractive index difference for optical filters including a medium and a plurality of particles dispersed in the medium. The effect of particle size and the difference between the refractive indices of the medium and the particle on the near-infrared scattering ratio was evaluated using a model, and the results of the model are presented in FIG. 12. The X axis represents difference between refractive indices (media-particle) and the Y axis represents particle diameters (in microns). The contour lines represent different scattering ratios such as 0.2, 0.4, 0.6, 0.8, 1, 1.2, 1.4, 1.6, and 1.8. Thus, curve 82 represents a near-infrared scattering ratio of 0.2. Curve 84 represents a near-infrared scattering ratio of 0.4. Curve 86 represents a near-infrared scattering ratio of 0.6. Curve 88 represents a near-infrared scattering ratio of 0.8.

Example 11

Figure 13:
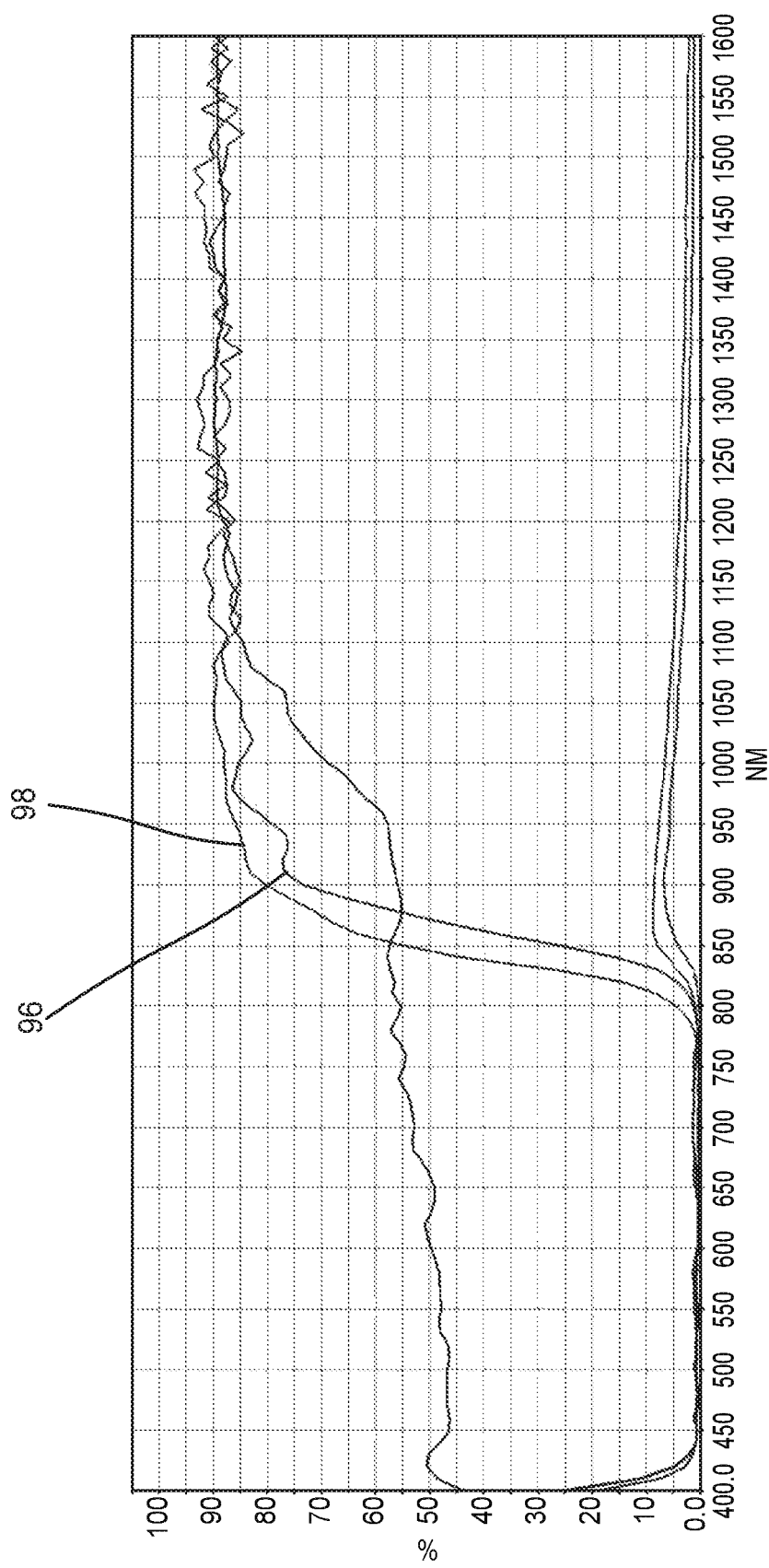
FIG. 13 is a chart presenting % transmittance versus wavelength for a reflective multilayer optical film coated with a near-infrared antireflective coating compared to a reflective multilayer optical film without a near-infrared antireflective coating.

The effect of applying a near-infrared anti-reflective coating on a near-infrared film was evaluated. The transmittance of a reflective multilayer optical film coated with a near-infrared antireflective coating was compared to a reflective multilayer optical film without an infrared antireflective coating. FIG. 13 is a chart presenting % transmittance versus wavelength for the reflective multilayer optical film coated with a near-infrared antireflective coating (curve 98) compared to the reflective multilayer optical film without a near-infrared antireflective coating (curve 96). As seen in curve 96, the reflective multilayer optical film presented high order harmonics outside of the main reflective band. The harmonic ripples were stronger closer to the main reflective band. As seen in curve 98, applying the near-infrared antireflective coating increased the transmission and smoothed out the harmonic ripples.

Various examples of the invention have been described. These and other examples are within the scope of the following claims.

The invention claimed is:

1. A system comprising:
one or both of a light emitter or a light receiver; and
an optical filter adjacent one or both of the light emitter or the light receiver, wherein the optical filter comprises:
a wavelength selective scattering layer, wherein the wavelength selective scattering layer is configured to scatter visible light;
a wavelength selective reflecting layer, wherein the wavelength selective reflecting layer has a predetermined transmission band configured to compensate for a color deviation in light emitted by the light emitter or received by the light receive; and
a low-index layer having a refractive index lower than 1.35, the wavelength selective reflecting layer being disposed between the low-index layer and the wavelength selective scattering layer.

2. The system of claim 1, wherein the wavelength selective scattering layer is configured to transmit near-infrared light.

3. The system of claim 1, wherein the predetermined transmission band is configured to compensate for the color deviation by shifting a scattered color towards a predetermined reference color.

4. The system of claim 1, wherein the transmission band includes a narrow band centered at a wavelength between about 400 and about 600 nm.

5. The system of claim 1, wherein the wavelength selective reflecting layer has a transmittance below a predetermined threshold between a lower transmission band edge and an upper transmission band edge of the predetermined transmission band, and wherein the wavelength selective reflecting layer has a transmittance above the predetermined threshold beyond the lower and upper transmission band edges.

6. The system of claim 1, wherein one or both of the light emitter or the light receiver have an operating wavelength within a near-infrared range.

7. The system of claim 1, wherein the wavelength selective scattering layer transmits less than about 50% of incident visible light, and wherein the wavelength selective scattering layer transmits greater than about 50% of incident near-infrared light.

8. The system of claim 1, wherein the wavelength selective scattering layer scatters greater than about 50% of incident visible light.

9. The system of claim 1, wherein the wavelength selective scattering layer comprises an optical medium have a first refractive index, wherein the optical medium comprises a plurality of particles, wherein the plurality of particles has a second refractive index and an average particle size of less than about 5 µm, and wherein an absolute difference between the first refractive index and the second refractive index is less than about 0.1.

10. The system of claim 1, wherein the wavelength selective scattering layer comprises an optical medium having a first refractive index, wherein the optical medium comprises a plurality of particles, wherein the plurality of particles has a second refractive index and an average particle size of less than about 1 µm, and wherein an absolute difference between the first refractive index and the second refractive index is less than about 0.2.

11. The system of claim 1, wherein the wavelength selective scattering layer comprises an optical medium having a first refractive index, wherein the optical medium comprises a plurality of particles, wherein the plurality of particles has a second refractive index and an average particle size of less than about 0.5 µm, and wherein an absolute difference between the first refractive index and the second refractive index is less than about 0.4.

12. The system of claim 1, wherein the wavelength selective scattering layer has a visible haze of at least 25%.

13. The system of claim 1, wherein the wavelength selective reflecting layer comprises a multilayer optical film.

14. The system of claim 1, further comprising a retroreflective layer adjacent the wavelength selective reflecting layer.

15. The system of claim 1, further comprising a wavelength selective absorbing layer, wherein the wavelength selective absorbing layer transmits visible wavelengths.

16. The system of claim 1, wherein the optical filter comprises surface optical microstructures.

17. The system of claim 1, wherein the optical filter has a visible transmittance at 380-800 nm of less than 5% and a near-infrared transmittance at 830-900 nm of greater than 5% for wavelengths greater than 830 nm.

18. The system of claim 1 comprising the light emitter, wherein the light emitter comprises a near-infrared LED or a near-infrared laser.

19. The system of claim 1 comprising the light receiver, wherein the optical filter is configured to at least partially shield the light receiver from visible wavelengths while substantially allowing the light receiver to receive near-infrared wavelengths.

20. The system of claim 1, wherein the optical filter is configured to camouflage one or both of the light receiver or the light emitter from a visual perception.

* * * * *

UNITED STATES PATENT AND TRADEMARK OFFICE
CERTIFICATE OF CORRECTION

| | |
|---|---|
| PATENT NO. | : 11,448,808 B2 |
| APPLICATION NO. | : 16/475207 |
| DATED | : September 20, 2022 |
| INVENTOR(S) | : Guanglei Du |

It is certified that error appears in the above-identified patent and that said Letters Patent is hereby corrected as shown below:

In the Claims

Column 44
Line 8, In Claim 1, delete "light receive" and insert -- light receiver --, therefor.
Line 43, In Claim 9, delete "have" and insert -- having --, therefor.

Signed and Sealed this
Twenty-fifth Day of June, 2024

Katherine Kelly Vidal
*Director of the United States Patent and Trademark Office*